United States Patent
Rengan et al.

(10) Patent No.: US 12,161,117 B2
(45) Date of Patent: Dec. 10, 2024

(54) AGROCHEMICAL COMBINATIONS

(71) Applicant: UPL LTD, Haldia (IN)

(72) Inventors: Srinivasan Rengan, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 1006 days.

(21) Appl. No.: 17/255,778

(22) PCT Filed: Jul. 5, 2019

(86) PCT No.: PCT/IB2019/055749
§ 371 (c)(1),
(2) Date: Dec. 23, 2020

(87) PCT Pub. No.: WO2020/012312
PCT Pub. Date: Jan. 6, 2020

(65) Prior Publication Data
US 2021/0127680 A1    May 6, 2021

(30) Foreign Application Priority Data
Jul. 10, 2018 (IN) .............. 201831025713

(51) Int. Cl.
| A01N 53/00 | (2006.01) |
| A01N 37/46 | (2006.01) |
| A01N 41/10 | (2006.01) |
| A01N 43/56 | (2006.01) |
| A01N 43/713 | (2006.01) |
| A01N 47/34 | (2006.01) |

(52) U.S. Cl.
CPC ............ *A01N 53/00* (2013.01); *A01N 43/56* (2013.01); *A01N 47/34* (2013.01)

(58) Field of Classification Search
CPC ........ A01N 53/00; A01N 43/56; A01N 47/34; A01N 37/46; A01N 41/10; A01N 43/713; A01N 2300/00
See application file for complete search history.

(56) References Cited

U.S. PATENT DOCUMENTS

| 2013/0281458 A1 | 10/2013 | Sakamoto et al. |
| 2016/0278380 A1 | 9/2016 | Ito et al. |
| 2021/0267207 A1 | 9/2021 | Rengan et al. |

FOREIGN PATENT DOCUMENTS

| CN | 102057933 A | 5/2011 |
| CN | 102228053 A | 11/2011 |
| CN | 104322536 A | 2/2015 |
| CN | 104488949 A | 4/2015 |
| CN | 105052984 A | 11/2015 |
| CN | 105123739 A | 12/2015 |
| CN | 105519564 A | 4/2016 |
| CN | 106135245 A | 11/2016 |
| CN | 106212460 A | 12/2016 |
| CN | 106342875 A | 1/2017 |
| CN | 106508947 A | 3/2017 |
| CN | 106718455 A | 5/2017 |
| CN | 106961959 A | 7/2017 |
| CN | 107212010 A | 9/2017 |
| CN | 108174846 A | 6/2018 |
| WO | 2003015519 A1 | 2/2003 |
| WO | 2012080415 A1 | 6/2012 |

OTHER PUBLICATIONS

International Search Report and Written Opinion for International Application PCT/IB2019/055746; International Filing Date: Jul. 5, 2019; Date of Mailing: Oct. 11, 2019; 11 pages.
International Search Report and Written Opinion for International Application PCT/IB2019/055749; International Filing Date: Jul. 5, 2019; Date of Mailing: Oct. 8, 2019; 10 pages.

*Primary Examiner* — Sun Jae Yoo
(74) *Attorney, Agent, or Firm* — CANTOR COLBURN LLP

(57) ABSTRACT

Disclosed herein is a combination comprising: at least one insecticidal diamide compound; at least one benzoylphenyl urea compound; and at least third insecticidal compound.

4 Claims, No Drawings

AGROCHEMICAL COMBINATIONS

CROSS REFERENCE TO RELATED APPLICATIONS

This application is a National Stage application of PCT/IB2019/055749, filed Jul. 5, 2019, which claims the benefit of priority to Indian patent application Ser. No. 201831025713, filed Jul. 10, 2018, both of which are incorporated by reference in their entirety herein.

TECHNICAL FIELD

The present invention relates to combinations of diamide insecticidal compound and at least one benzoylphenyl urea insecticidal compound and at least another insecticidal compound. The said combinations demonstrate excellent efficacy in the control of unwanted pests.

BACKGROUND OF THE INVENTION

Insecticides are used to control a wide variety of insect pests. Diamides insecticides are a relatively new group of insecticides and include insecticides such as flubendiamide, a highly potent lepidoptericide and chlorantraniliprole and its analogue cyantraniliprole. Evolution of diamide can be studied in article published Pest Manag Sci. 2013 January; 69(1):7-14.

Chlorantraniliprole and cyantraniliprole are anthranilic diamide insecticidal compounds which exhibit larvicidal activity as orally ingested toxicants which target and disrupt the $Ca^{2+}$ balance and Ryanodine receptor.

Benzoylphenyl urea insecticides are known in the art to be active against insect larvae and eggs. Benzoylphenyl urea insecticides are known to inhibit chitin biosynthesis in larvae and eggs of insecticides.

The combination of diamide and benzoylphenyl urea insecticides are known in the art, for example from WO2003015519A1 (Lahm) teaches combinations of diamide insecticides in combination with insecticides such as benzoylphenyl urea insecticides such as Novaluron. However, the spectrum of the combination is not broad enough to control the pest pressure seen in present times.

There is therefore a need in the art for combinations of anthranilamide insecticidal compound with a specific insecticide that helps improve spectrum. With crop tolerances decreasing, lower use rates being imposed and resistance increasingly observed, there is a need for a combination of actives that allows for broader spectrum of disease control that combines curative and preventive actives and has a lower dosage.

Therefore, embodiments of the present invention may ameliorate one or more of the above-mentioned problems:

Therefore, embodiments of the present invention may provide combinations that possess an enhanced efficacy over the individual active compound used in isolation.

Another object of the present invention is to provide combinations that cause an enhanced greening of the crops to which it is administered.

Another object of the present invention is to provide combinations that causes late senescence to the crop to which it is applied thereby resulting into an increasing yield of the crop.

Yet another object of the present invention is to provide combinations that results into reduced incidence of insect pests in the crops to which it is applied.

Another object of the present invention is to provide combinations that achieves increased yield in the crops to which it is applied.

Another object of the present invention is to provide insecticidal combinations that causes an enhanced larvicidal activity.

Another object of the present invention is to provide combinations which enhance the protection to plants from attack or infestation by insects, acarids or nematodes.

Some or all these and other objects of the invention are can be achieved by way of the invention described hereinafter.

SUMMARY OF THE INVENTION

Thus, an aspect of the present invention may provide a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least one benzoylphenyl urea compound; and
- at least another insecticidal compound.

Thus, an aspect of the present invention may provide a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least one benzoylphenyl urea insecticide; and
- at least another insecticidal compound.

Another aspect of the present invention can provide a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least one benzoylphenyl urea insecticide; and
- at least two other insecticidal compounds.

Another aspect of the present invention can provide synergistic compositions comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least one benzoylphenyl urea insecticide;
- at least one other insecticidal compound; and
- at least one agrochemically acceptable excipient.

Another aspect of the present invention can provide synergistic compositions comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least one benzoylphenyl urea insecticide;
- at least two other insecticidal compounds; and
- at least one agrochemically acceptable excipient.

DETAILED DESCRIPTION

The term 'plants' refers to all physical parts of a plant, including seeds, seedlings, saplings, roots, tubers, stems, stalks, foliage and fruits. The term "locus" of a plant as used herein is intended to embrace the place on which the plants are growing, where the plant propagation materials of the plants are sown or where the plant propagation materials of the plants will be placed into the soil. The term "insects"

includes all organisms in the class "Insecta." "Insecticidal" refers to the ability of a substance to increase mortality or inhibit, growth rate of insects. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion. The term "agriculturally acceptable amount of active" refers to an amount of an active that kills or inhibits the plant disease for which control is desired, in an amount not significantly toxic to the plant being treated. To "control" or "controlling" insects means to inhibit, through a toxic effect, the ability of insect pests to survive, grow, feed, and/or reproduce, or to limit insect-related damage or loss in crop plants.

Surprisingly, the insecticidal and/or acaricidal and/or antimicrobial activity and/or the plant-invigorating activity and/or the yield-enhancing activity of the active compound combinations according to the invention are significantly higher than the sum of the activities of the individual active compounds.

It has surprisingly been found that the addition the third insecticide to the combinations of the diamide insecticide and the benzoylphenyl urea insecticide resulted in surprising and unexpected advantages. It was surprising that the addition of the third insecticide to the combination of the diamide insecticide and the benzoylphenyl urea insecticide resulted in an enhancement of the efficacy, and a surprisingly enhanced pest control.

It has further been found that the addition of a third insecticide to diamide insecticides and benzoylphenyl urea insecticides resulted in better greening in the crop thereby increasing the level of photosynthesis occurring within the plant, thereby leading to a greater yield from the crop to which they were applied.

These surprising advantages of the combinations of the invention were not observed when the diamide insecticide or the benzoylphenyl urea insecticide or the third insecticidal active was not present in the combination. Therefore, these unexpected advantages of the combination of the present invention could be attributed to the inclusion of the diamide insecticide or the benzoylphenyl urea insecticide or the third insecticidal active to the combination.

In any aspect or embodiment described hereinafter, the clause comprising shall be deemed to be replaced with the clauses "consisting of" or "consisting essentially of" or "consisting substantially of".

Thus, in an aspect, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide; and
(c) at least another insecticidal compound.

Thus, in an embodiment, the benzoylphenyl urea insecticide may be selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof.

Thus, in this aspect, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) chlorfluazuron; and
(c) at least another insecticidal compound.

In an embodiment, the anthranilamide compound is selected from diamide class. However, the choice of anthranilamide compound may not be limited to these diamide class alone.

In an embodiment, the diamide class of anthranilamide compound may be selected from at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole and mixtures thereof.

In an embodiment, the preferred diamide insecticide is chlorantraniliprole. Chlorantraniliprole has the chemical name 3-bromo-4'-chloro-1-(3-chloro-2-pyridyl)-2'-methyl-6'-(methylcarbamoyl)pyrazole-5-carboxanilide and has the structure:

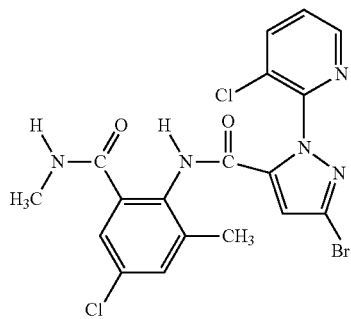 [SMILES: CNC(=O)c1cc(Cl)cc(C)c1NC(=O)c1cc(Br)nn1-c1ncccc1Cl]

Thus, in this embodiment, the present invention provides a combination comprising:
(a) chlorantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) chlorantraniliprole;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) chlorantraniliprole;
(b) chlorfluazuron; and
(c) at least another insecticidal compound.

In an embodiment, the preferred diamide insecticide is cyantraniliprole. Cyantraniliprole has the chemical name 3-bromo-1-(3-chloro-2-pyridyl)-4'-cyano-2'-methyl-6'-(methylcarbamoyl)pyrazole-5-carboxanilide and the structure:

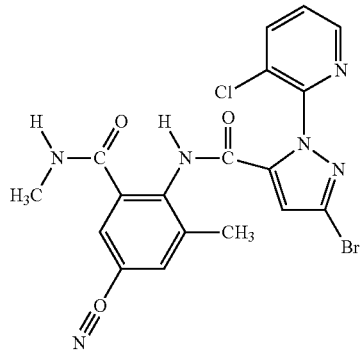

Thus, in this embodiment, the present invention provides a combination comprising:
(a) cyantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) cyantraniliprole;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) cyantraniliprole;
(b) chlorfluazuron; and
(c) at least another insecticidal compound.

In an embodiment, the preferred diamide insecticide is cyclaniliprole. Cyclaniliprole has the chemical name 2',3-dibromo-4'-chloro-1-(3-chloro-2-pyridyl)-6'-{[(1RS)-1-cyclopropylethyl]carbamoyl}pyrazole-5-carboxanilide and has the structure:

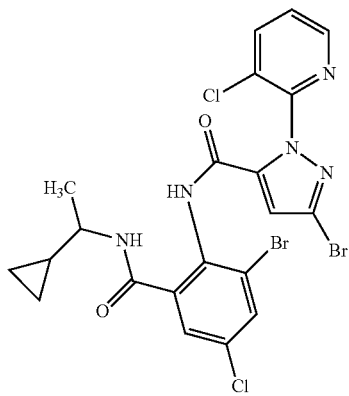 [SMILES: CC(NC(=O)c1cc(Cl)cc(Br)c1NC(=O)c1cc(Br)nn1-c1ncccc1Cl)C1CC1]

Thus, in this embodiment, the present invention provides a combination comprising:
(a) cyclaniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) cyclaniliprole;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) cyclaniliprole;
(b) chlorfluazuron; and
(c) at least another insecticidal compound.

In an embodiment, the preferred diamide insecticide is cyhalodiamide. Cyhalodiamide has the chemical name 3-chloro-N'-(1-cyano-1-methylethyl)-N-{4-[1,2,2,2-tetrafluoro-1-(trifluoromethyl)ethyl]-o-tolyl}phthalamide and has the structure:

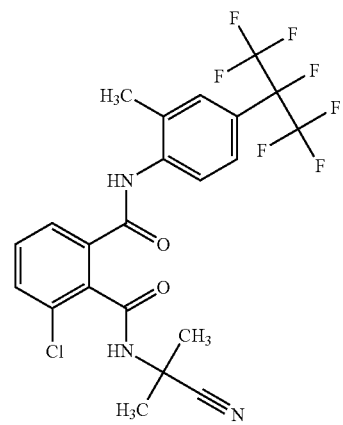 [SMILES: Cc1cc(C(F)(C(F)(F)F)C(F)(F)F)ccc1NC(=O)c1cccc(Cl)c1C(=O)NC(C)(C)C#N]

Thus, in this embodiment, the present invention provides a combination comprising:
(a) cyhalodiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) cyhalodiamide;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) cyhalodiamide;
(b) chlorfluazuron; and
(c) at least another insecticidal compound.

In an embodiment, the preferred diamide insecticide is flubendiamide. Flubendiamide has the chemical 3-iodo-N'-(2-mesyl-1,1-dimethylethyl)-N-{4-[1,2,2,2-tetrafluoro-1-(trifluoromethyl)ethyl]-o-tolyl}phthalamide and have the structure:

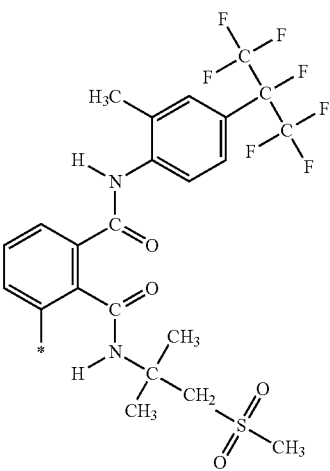 [SMILES: *c1cccc(C(=O)Nc2ccc(C(F)(C(F)(F)F)C(F)(F)F)cc2C)c1C(=O)NC(C)(C)CS(C)(=O)=O]

Thus, in this embodiment, the present invention provides a combination comprising:
(a) flubendiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) flubendiamide;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) flubendiamide;
(b) chlorfluazuron; and
(c) at least another insecticidal compound.

In an embodiment, the preferred diamide insecticide is tetraniliprole. Tetraniliprole has the chemical name 1-(3-chloro-2-pyridyl)-4'-cyano-2'-methyl-6'-methylcarbamoyl-3-{[5-(trifluoromethyl)-2H-tetrazol-2-yl]methyl}pyrazole-5-carboxanilide, and has the following structure:

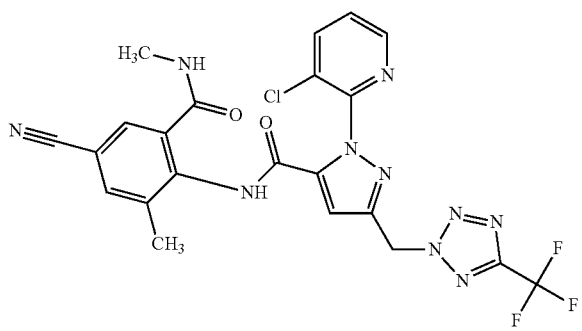 [SMILES: CNC(=O)c1cc(C#N)cc(C)c1NC(=O)c1cc(Cn2nnc(C(F)(F)F)n2)nn1-c1ncccc1Cl]

Thus, in this embodiment, the present invention provides a combination comprising:
(a) tetraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) tetraniliprole;
(b) novaluron; and
(c) at least another insecticidal compound.

In an embodiment, the preferred benzoylphenyl urea insecticide is chlorfluazuron.

Thus, in this embodiment, the present invention provides a combination comprising:
(a) tetraniliprole;
(b) chlorfluazuron; and
(c) at least another insecticidal compound.

In an embodiment, the preferred diamide insecticide is broflanilide. Broflanilide has the chemical name 6'-bromo-α,α,α,2-tetrafluoro-3-(N-methylbenzamido)-4'-[1,2,2,2-tetrafluoro-1-(trifluoromethyl)ethyl]benz-o-toluidide, and has the following structure:

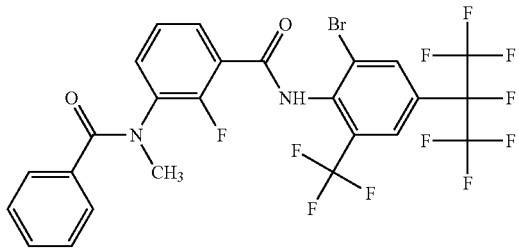 [SMILES: CN(C(=O)c1ccccc1)c1cccc(C(=O)Nc2c(Br)cc(C(F)(C(F)(F)F)C(F)(F)F)cc2C(F)(F)F)c1F]

Thus, in this embodiment, the present invention provides a combination comprising:
(a) broflanilide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least another insecticidal compound.

In an embodiment, the preferred benzoylphenyl urea insecticide is novaluron.

Thus, in this embodiment, the present invention provides a combination comprising:
(a) broflanilide;
(b) novaluron; and
(c) at least another insecticidal compound.

In an embodiment, the preferred benzoylphenyl urea insecticide is chlorfluazuron. Thus, in this embodiment, the present invention provides a combination comprising:
(a) broflanilide;
(b) chlorfluazuron; and
(c) at least another insecticidal compound.

In an embodiment, the third insecticidal compound in the combinations of the present invention may be selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

Thus in an embodiment, the Acetylcholinesterase (AChE) inhibitors may be selected from the group consisting of carbamates such as alanycarb, aldicarb, bendiocarb, benfuracarb, carbaryl, carbofuran, carbosulfan, phenothiocarb, methiocarb, methomyl, oxamyl, pirimicarb, propoxur, thiodicarb, ethiofencarb, fenobucarb, MIPC, MPMC, MTMC, furathiocarb, XMC, aldoxicarb, allyxycarb, aminocarb, bufencarb, butacarb, butocarboxim, butoxycarboxim, cloethocarb, dimetilan, formetanate, metam-sodium, metolcarb, promecarb, thiophanox, trimethacarb, and xylylcarb. Organophosphates such as acephate, azamethiphos, azinphos-methyl, azinphos-ethyl, buromophos-ethyl, bromfenvinphos, BRP, chlorpyrifos, chlorpyrifos-methyl, chlorfenvinphos, cadusafos, carbophenothion, chloroethoxyfos, chlormephos, coumaphos, cyanofenphos, cyanophos, dichlorvos, dicrotophos, dimethoate, disulfoton, demeton-S-methyl, dimethylvinphos, demeton-S-methylsulfone, dialifos, diazinon, dichlofenthion, dioxabenzophos, disulfoton, ethion, ethoprophos, etrimfos, EPN, fenamiphos, fenitrothion, fenthion, fensulfothion, fonofos, formothion, phosmethylan, heptenophos, imicyafos, isazophos, iodofenphos, isofenphos, isoxathion, malathion, mevinphos, methamidophos, methidathion, monocrotophos, mecarbam, methacrifos, omethoate, oxydemeton-methyl, parathion, parathion-methyl, phenthoate, phosalone, phosmet, phosphamidon, phorate, phoxim, pirimiphos-methyl, pirimiphos-ethyl, profenofos, prothiofos, fosthiazate, phosphocarb, propaphos, propethamphos, prothoate, pyridaphenthion, pyraclofos, quinalphos, sulprophos, sulfotepp, tetrachlorvinphos, terbufos, triazophos, trichlorfon, tebupirimfos, temephos, thiometon, vamidothion, and mixtures thereof.

In an embodiment, the preferred Acetylcholinesterase (AChE) inhibitors may be selected from thiodicarb, methomyl, acephate, and quinalphos.

In an embodiment, the preferred third insecticide may be acephate.

Thus, in this embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide; and
(c) acephate.

In an embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In another embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) novaluron; and
(c) acephate.

In an embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) chlorfluazuron; and
(c) acephate.

In another embodiment, the present invention provides a combination comprising:
(a) chlorantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) chlorantraniliprole;
(b) novaluron; and
(c) acephate.

In another embodiment, the present invention provides a combination comprising:
(a) chlorantraniliprole;
(b) chlorfluazuron; and
(c) acephate.

In an embodiment, the present invention provides a combination comprising:
(a) cyantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In another embodiment, the present invention provides a combination comprising:
(a) cyantraniliprole;
(b) novaluron; and
(c) acephate.

In another embodiment, the present invention provides a combination comprising:
(a) cyantraniliprole;
(b) chlorfluazuron; and
(c) acephate.

In an embodiment, the present invention provides a combination comprising:
(a) cyclaniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) cyclaniliprole;
(b) novaluron; and
(c) acephate.

In an embodiment, the present invention provides a combination comprising:
(a) cyclaniliprole;
(b) chlorfluazuron; and
(c) acephate.

In another embodiment, the present invention provides a combination comprising:
(a) cyhalodiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) cyhalodiamide;
(b) novaluron; and
(c) acephate.

In an embodiment, the present invention provides a combination comprising:
(a) cyhalodiamide;
(b) chlorfluazuron; and
(c) acephate.

In another embodiment, the present invention provides a combination comprising:
(a) flubendiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) flubendiamide;
(b) novaluron; and
(c) acephate.

In an embodiment, the present invention provides a combination comprising:
(a) flubendiamide;
(b) chlorfluazuron; and
(c) acephate.

In another embodiment, the present invention provides a combination comprising:
(a) tetraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) tetraniliprole;
(b) novaluron; and
(c) acephate.

In an embodiment, the present invention provides a combination comprising:
(a) tetraniliprole;
(b) chlorfluazuron; and
(c) acephate.

In another embodiment, the present invention provides a combination comprising:
(a) broflanilide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) acephate.

In an embodiment, the present invention provides a combination comprising:
(a) broflanilide;
(b) novaluron; and
(c) acephate.

In an embodiment, the present invention provides a combination comprising:
(a) broflanilide;
(b) chlorfluazuron; and
(c) acephate.

In another embodiment, the GABA-gated chloride channel blockers may be selected from acetoprole, chloradane, endosulfan, ethiprole, fipronil, vaniliprole, pyrafluprole, and pyriprole and mixtures thereof.

The preferred GABA gated chloride channel blocker may be fipronil.

Thus, in an embodiment, the present invention provides a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least benzoylphenyl urea insecticide; and
- fipronil.

In an embodiment, the present invention provides a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In another embodiment, the present invention provides a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- novaluron; and
- fipronil.

In an embodiment, the present invention provides a combination comprising:
- at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
- chlorfluazuron; and
- fipronil.

In another embodiment, the present invention provides a combination comprising:
- chlorantraniliprole;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In an embodiment, the present invention provides a combination comprising:
- chlorantraniliprole;
- novaluron; and
- fipronil.

In another embodiment, the present invention provides a combination comprising:
- chlorantraniliprole;
- chlorfluazuron; and
- fipronil.

In an embodiment, the present invention provides a combination comprising:
- cyantraniliprole;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In another embodiment, the present invention provides a combination comprising:
- cyantraniliprole;
- novaluron; and
- fipronil.

In another embodiment, the present invention provides a combination comprising:
- cyantraniliprole;
- chlorfluazuron; and
- fipronil.

In an embodiment, the present invention provides a combination comprising:
- cyclaniliprole;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In an embodiment, the present invention provides a combination comprising:
- cyclaniliprole;
- novaluron; and
- fipronil.

In an embodiment, the present invention provides a combination comprising:
- cyclaniliprole;
- chlorfluazuron; and
- fipronil.

In another embodiment, the present invention provides a combination comprising:
- cyhalodiamide;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In an embodiment, the present invention provides a combination comprising:
- cyhalodiamide;
- novaluron; and
- fipronil.

In an embodiment, the present invention provides a combination comprising:
- cyhalodiamide;
- chlorfluazuron; and
- fipronil.

In another embodiment, the present invention provides a combination comprising:
- flubendiamide;
- at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
- fipronil.

In an embodiment, the present invention provides a combination comprising:
flubendiamide;
novaluron; and
fipronil.

In an embodiment, the present invention provides a combination comprising:
flubendiamide;
chlorfluazuron; and
fipronil.

In another embodiment, the present invention provides a combination comprising:
tetraniliprole;
at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
fipronil.

In an embodiment, the present invention provides a combination comprising:
tetraniliprole;
novaluron; and
fipronil.

In an embodiment, the present invention provides a combination comprising:
tetraniliprole;
chlorfluazuron; and
fipronil.

In another embodiment, the present invention provides a combination comprising:
broflanilide;
at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and fipronil.

In an embodiment, the present invention provides a combination comprising:
broflanilide;
novaluron; and
fipronil.

In an embodiment, the present invention provides a combination comprising:
broflanilide;
chlorfluazuron; and
fipronil.

In an embodiment, the Sodium channel modulators may be selected from Pyrethroids such as allethrin, bifenthrin, cyfluthrin, beta-cyfluthrin, cyhalothrin, lambda-cyhalothrin, cyphenothrin, chloroprallethrin, cypermethrin, alpha-cypermethrin, beta-cypermethrin, zeta-cypermethrin, deltamethrin, esfenvalerate, ethofenprox, fenpropathrin, fenvalerate, imiprothrin, permethrin, prallethrin, pyrethrin, pyrethrin I, pyrethrin II, resmethrin, silafluofen, fluvalinate, tefluthrin, tetramethrin, tralomethrin, transfluthrin, profluthrin, dimefluthrin, acrinathrin, cycloprothrin, halfenprox, flucythrinate, bioallethrin, bioethanomethrin, biopermethrin, bioresmethrin, transpemethrin, empenthrin, fenfluthrin, fenpirithrin, flubrocythrinate, flufenprox, flumethrin, metofluthrin, phenothrin, protrifenbute, pyresmethrin, terallethrin, meperfluthrin, tetramethylfluthrin, valerate protrifenbute, silafluofen, sulfoxime ((RS)-[1-(4-chlorophenyl)-2-(methylthio)-1-propanone] (EZ)—O-(3-phenoxybenzyl) oxime), thiofluoximate, Methoxychlor cinerin-I, cinerin-II, jasmolin-I, jasmolin-II or mixtures thereof.

The preferred Sodium channel modulator may be bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

Thus, in an embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) novaluron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) chlorfluazuron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) chlorantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) chlorantraniliprole;
(b) novaluron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) chlorantraniliprole;
(b) chlorfluazuron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyantraniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) cyantraniliprole;
(b) novaluron; and
(c) at least one insecticide selected from bifenthrin, kappa-bifenthrin, gam ma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) cyantraniliprole;
(b) chlorfluazuron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyclaniliprole;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyclaniliprole;
(b) novaluron; and
(c) at least one insecticide selected from bifenthrin, kappa-bifenthrin, gam ma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyclaniliprole;
(b) chlorfluazuron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) cyhalodiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyhalodiamide;
(b) novaluron; and
(c) at least one insecticide selected from bifenthrin, kappa-bifenthrin, gam ma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
(a) cyhalodiamide;
(b) chlorfluazuron; and
(c) at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
(a) flubendiamide;
(b) at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
(c) at least one insecticide selected from bifenthrin, kappa-bifenthrin, gamma-cyhalothrin, lambda-cyhalothrin, cypermethrin, alpha-cyper- In an embodiment, the present invention provides a combination comprising:
(a) flubendiamide;
(b) novaluron; and
(c) at least one insecticide selected from bifenthrin, kappa-bifenthrin, gam ma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
a. flubendiamide;
b. chlorfluazuron; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
a. tetraniliprole;
b. at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
a. tetraniliprole;
b. novaluron; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
a. tetraniliprole;
b. chlorfluazuron; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In another embodiment, the present invention provides a combination comprising:
a. broflanilide;
b. at least benzoylphenyl urea insecticide selected from the group consisting of bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron and mixtures thereof; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
a. broflanilide;
b. novaluron; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the present invention provides a combination comprising:
a. broflanilide;
b. chlorfluazuron; and
c. at least one insecticide selected from bifenthrin, kappa-bifenthrin, gamma-cyhalothrin, lambda-cyhalothrin, cypermethrin, alpha-cypermethrin, beta-cypermethrin, theta-cypermethrin, zeta-cypermethrin, fenpropathrin, permethrin and mixtures thereof.

In an embodiment, the nicotinic acetylcholine receptor (nAChR) competitive modulators may be selected from Neonicotinoids such as Acetamiprid, Clothianidin, Dinotefuran, Imidacloprid, Nitenpyram, Thiacloprid, Thiamethoxam; Sulfoximines such as sulfoxaflor; Butenolides such as Flupyradifurone; Mesoionics such as Triflumezopyrim and mixtures thereof.

The preferred nicotinic acetylcholine receptor (nAChR) competitive modulators may be Acetamiprid, Clothianidin, Imidacloprid, Thiacloprid, Thiamethoxam, and sulfoxaflor.

In an embodiment, the Nicotinic acetylcholine receptor (nAChR) allosteric modulators may be selected from Spinosyns such as Spinetoram, Spinosad and mixtures thereof.

The preferred Nicotinic acetylcholine receptor (nAChR) allosteric modulators may be Spinosad.

In an embodiment, the Glutamate gated chloride channel (GluCl) allosteric modulators such as abamectin, emamectin benzoate, milbemectin, milbemycin A3, Milbemycin A4, lepimectin, spinosad, ivermectin, selamectin, doramectin, eprinomectin, moxidectin, milbemycin oxime, and spinetoram and mixtures thereof.

The preferred Glutamate gated chloride channel (GluCl) allosteric modulators may be abamectin.

The preferred Glutamate gated chloride channel (GluCl) allosteric modulators may be abamectin.

In an embodiment, the Juvenile hormone mimics may be selected from Diofenolan, fenoxycarb, Kinoprene, Methoprene, Epofenonane, Hydroprene, Pyriproxyfen, triprene, and mixtures thereof.

The preferred juvenile hormone mimic may be Pyriproxyfen.

In an embodiment, the Miscellaneous nonspecific (multisite) inhibitor insecticides may be selected from Methyl bromide and the like, Chloropicrin, Cryolite (Sodium aluminum fluoride), Sulfuryl fluoride, Borax, Boric acid, Disodium octaborate, Sodium borate, Sodium metaborate, Tartar emetic, Dazomet, Metam and mixtures thereof.

In an embodiment, the Chordotonal organ TRPV channel modulators may be selected from Pymetrozine, Pyrifluquinazon, Afidopyropen and mixtures thereof.

In an embodiment, Mite growth inhibitors may be selected from Clofentezine, Diflovidazin, Hexythiazox, Etoxazole and mixtures thereof.

In an embodiment, Microbial disruptors of insect midgut membranes may be selected from *Bacillus thuringiensis* subsp. Israelensis, *Bacillus thuringiensis* subsp. Aizawai, *Bacillus thuringiensis* subsp. Kurstaki, *Bacillus thuringiensis* subsp. Tenebrionis, B.t. crop proteins such as Cry1Ab, Cry1Ac, Cry1Fa, Cry1A.105, Cry2Ab, Vip3A, mCry3A, Cry3Ab, Cry3Bb, Cry34Ab1/Cry35Ab1, *Bacillus sphaericus* and the like.

In an embodiment, Inhibitors of mitochondrial ATP synthase may be selected from azocyclotin, cyhexatin, diafenthiuron, fenbutatin-oxide, propargite, and tetradifon and mixtures thereof.

In an embodiment, Uncouplers of oxidative phosphorylation via disruption of the proton gradient may be selected from Chlorfenapyr, DNOC, Sulfluramid and mixtures thereof.

In an embodiment. Nicotinic acetylcholine receptor (nAChR) channel blockers may be selected from Bensultap, Cartap hydrochloride, Thiocyclam, Thiosultap-sodium and mixtures thereof.

In an embodiment, moulting disruptors may be selected from cyromazine and the like.

In an embodiment, Ecdysone receptor agonists may be selected from Azadirachtin, Chromafenozide, Halofenozide, methoxyfenozide, tebufenozide, chromafenozide, and mixtures thereof.

The preferred Ecdysone receptor agonists may be selected from Methoxyfenozide.

In an embodiment, Octopamine receptor agonists may be selected from amitraz and the like.

In an embodiment, Mitochondrial complex electron transport inhibitors may be selected from Hydramethylnon, Acequinocyl, Fluacrypyrim, Bifenazate, Fenazaquin, Fenpyroximate, Pyridaben, Pyrimidifen, Tebufenpyrad, Tolfenpyrad, Rotenone, Aluminium phosphide, Calcium phosphide, Phosphine, Zinc phosphide, Calcium cyanide, Potassium cyanide, Sodium cyanide, Cyenopyrafen, Cyflumetofen, Pyflubumide and mixtures thereof.

The preferred mitochondrial complex electron transport inhibitors may be Bifenazate, Fenpyroximate, Pyridaben, Tebufenpyrad, Tolfenpyrad.

In an embodiment, Voltage-dependent sodium channel blockers may be selected from Indoxacarb, Metaflumizone and mixtures thereof.

In an embodiment, Inhibitors of acetyl CoA carboxylase may be selected from Tetronic and Tetramic acid derivatives such as Spirodiclofen, Spiromesifen, Spirotetramat and, Spiropidion mixtures thereof.

In an embodiment, Chordotonal organ Modulators—undefined target site may be selected from Flonicamid and the like.

In an embodiment, the insecticides with unknown modes of action may be selected from acynonapyr, benzpyrimoxan, closantel, copper naphthenate, crotamiton, EXD, Fenazaflor, fenoxacrim, flometoquin, fluhexafon, flupyrimin, isoprothiolane, Jiahuangchongzong, malonoben, nifluridide, oxazosulfyl, plifenate, pyridaben, Pyridalyl, rafoxanide, thuringiensin, triarathene, triazamate.

In an embodiment, the biopesticide may be selected from botanical insecticides such as azadirectin A, euginol, neem oil, toosendanin, 1-cinnamoyl-3-feruoyl-11-hydroxymeliacarpin, volkensin, d-limonene, menthol, 1,8-cineole, citronellal, eugenol, p-menthane-3,8-diol, thymol and the like and mixtures thereof.

In an embodiment the preferred amide anthranilamide insecticidal compound is chlorantraniliprole.

In an embodiment, the preferred anthranilamide insecticide compound is cyanantraniliprole.

Thus, an aspect of the present invention may provide combinations comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least one benzoylphenyl urea insecticide; and
(c) at least one insecticidal active selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

The preferred combinations according to an embodiment of the present invention may be selected from the combinations of table 1, which is intended to be exemplary and not limiting the scope of the invention. In these embodiments, the combinations comprise at least one diamide insecticide, at least one benzoylphenyl urea insecticide and at least a third insecticide as exemplified in each individual row of the accompanying table. In the following table, the combinations listed in each individual row may be intended to be an embodiment of the present invention, which is in addition to the embodiments brought out hereinabove.

TABLE 1

| S No. | Diamide compound | Benzoylphenyl urea | Third insecticide |
|---|---|---|---|
| 1 | Chlorantraniliprole | Chlorfluazuron | Acephate |
| 2 | Chlorantraniliprole | Chlorfluazuron | Thiodicarb |
| 3 | Chlorantraniliprole | Chlorfluazuron | Methomyl |
| 4 | Chlorantraniliprole | Chlorfluazuron | Quinalphos |
| 5 | Chlorantraniliprole | Chlorfluazuron | Dimethoate |
| 6 | Chlorantraniliprole | Chlorfluazuron | Fipronil |
| 7 | Chlorantraniliprole | Chlorfluazuron | Bifenthrin |
| 8 | Chlorantraniliprole | Chlorfluazuron | Cyhalothrin |
| 9 | Chlorantraniliprole | Chlorfluazuron | Lambda-cyhalothrin |
| 10 | Chlorantraniliprole | Chlorfluazuron | Cypermethrin |
| 11 | Chlorantraniliprole | Chlorfluazuron | Permethrin |
| 12 | Chlorantraniliprole | Chlorfluazuron | Kappa-bifenthrin |
| 13 | Chlorantraniliprole | Chlorfluazuron | Gamma-cyhalothrin |
| 14 | Chlorantraniliprole | Chlorfluazuron | Alpha-cypermethrin |
| 15 | Chlorantraniliprole | Chlorfluazuron | Beta-cypermethrin |
| 16 | Chlorantraniliprole | Chlorfluazuron | Theta-cypermethrin |
| 17 | Chlorantraniliprole | Chlorfluazuron | Zeta-cypermethrin |
| 18 | Chlorantraniliprole | Chlorfluazuron | Acetamiprid |
| 19 | Chlorantraniliprole | Chlorfluazuron | Clothianidin |
| 20 | Chlorantraniliprole | Chlorfluazuron | Dinotefuran |
| 21 | Chlorantraniliprole | Chlorfluazuron | Imidacloprid |
| 22 | Chlorantraniliprole | Chlorfluazuron | Thiacloprid |
| 23 | Chlorantraniliprole | Chlorfluazuron | Thiamethoxam |
| 24 | Chlorantraniliprole | Chlorfluazuron | Sulfoxaflor |
| 25 | Chlorantraniliprole | Chlorfluazuron | Spinosad |
| 26 | Chlorantraniliprole | Chlorfluazuron | Abamectin |
| 27 | Chlorantraniliprole | Chlorfluazuron | Emamectin benzoate |
| 28 | Chlorantraniliprole | Chlorfluazuron | Pyriproxyfen |
| 29 | Chlorantraniliprole | Chlorfluazuron | *Bacillus thuringiensis* |
| 30 | Chlorantraniliprole | Chlorfluazuron | Azadirachtin |
| 31 | Chlorantraniliprole | Chlorfluazuron | Methoxyfenozide |
| 32 | Chlorantraniliprole | Chlorfluazuron | Bifenazate |
| 33 | Chlorantraniliprole | Chlorfluazuron | Fenpyroximate |
| 34 | Chlorantraniliprole | Chlorfluazuron | Pyridaben |
| 35 | Chlorantraniliprole | Chlorfluazuron | Tebufenpyrad |

TABLE 1-continued

| S No. | Diamide compound | Benzoylphenyl urea | Third insecticide |
|---|---|---|---|
| 36 | Chlorantraniliprole | Chlorfluazuron | Tolfenpyrad |
| 37 | Chlorantraniliprole | Chlorfluazuron | Indoxacarb |
| 38 | Chlorantraniliprole | Chlorfluazuron | Metaflumizone |
| 39 | Chlorantraniliprole | Chlorfluazuron | Spirodiclofen |
| 40 | Chlorantraniliprole | Chlorfluazuron | Spirotetramet |
| 41 | Chlorantraniliprole | Chlorfluazuron | Flonicamid |
| 42 | Chlorantraniliprole | Chlorfluazuron | Eugenol |
| 43 | Chlorantraniliprole | Chlorfluazuron | Neem oil |
| 44 | Chlorantraniliprole | Chlorfluazuron | Citronella |
| 45 | Cyantraniliprole | Chlorfluazuron | Acephate |
| 46 | Cyantraniliprole | Chlorfluazuron | Thiodicarb |
| 47 | Cyantraniliprole | Chlorfluazuron | Methomyl |
| 48 | Cyantraniliprole | Chlorfluazuron | Quinalphos |
| 49 | Cyantraniliprole | Chlorfluazuron | Dimethoate |
| 50 | Cyantraniliprole | Chlorfluazuron | Fipronil |
| 51 | Cyantraniliprole | Chlorfluazuron | Bifenthrin |
| 52 | Cyantraniliprole | Chlorfluazuron | Cyhalothrin |
| 53 | Cyantraniliprole | Chlorfluazuron | Lambda-cyhalothrin |
| 54 | Cyantraniliprole | Chlorfluazuron | Cypermethrin |
| 55 | Cyantraniliprole | Chlorfluazuron | Permethrin |
| 56 | Cyantraniliprole | Chlorfluazuron | Kappa-bifenthrin |
| 57 | Cyantraniliprole | Chlorfluazuron | Gamma-cyhalothrin |
| 58 | Cyantraniliprole | Chlorfluazuron | Alpha-cypermethrin |
| 59 | Cyantraniliprole | Chlorfluazuron | Beta-cypermethrin |
| 60 | Cyantraniliprole | Chlorfluazuron | Theta-cypermethrin |
| 61 | Cyantraniliprole | Chlorfluazuron | Zeta-cypermethrin |
| 62 | Cyantraniliprole | Chlorfluazuron | Acetamiprid |
| 63 | Cyantraniliprole | Chlorfluazuron | Clothianidin |
| 64 | Cyantraniliprole | Chlorfluazuron | Dinotefuran |
| 65 | Cyantraniliprole | Chlorfluazuron | Imidacloprid |
| 66 | Cyantraniliprole | Chlorfluazuron | Thiacloprid |
| 67 | Cyantraniliprole | Chlorfluazuron | Thiamethoxam |
| 68 | Cyantraniliprole | Chlorfluazuron | Sulfoxaflor |
| 69 | Cyantraniliprole | Chlorfluazuron | Spinosad |
| 70 | Cyantraniliprole | Chlorfluazuron | Abamectin |
| 71 | Cyantraniliprole | Chlorfluazuron | Emamectin benzoate |
| 72 | Cyantraniliprole | Chlorfluazuron | Pyriproxyfen |
| 73 | Cyantraniliprole | Chlorfluazuron | *Bacillus thuringiensis* |
| 74 | Cyantraniliprole | Chlorfluazuron | Azadirachtin |
| 75 | Cyantraniliprole | Chlorfluazuron | Methoxyfenozide |
| 76 | Cyantraniliprole | Chlorfluazuron | Bifenazate |
| 77 | Cyantraniliprole | Chlorfluazuron | Fenpyroximate |
| 78 | Cyantraniliprole | Chlorfluazuron | Pyridaben |
| 79 | Cyantraniliprole | Chlorfluazuron | Tebufenpyrad |
| 80 | Cyantraniliprole | Chlorfluazuron | Tolfenpyrad |
| 81 | Cyantraniliprole | Chlorfluazuron | Indoxacarb |
| 82 | Cyantraniliprole | Chlorfluazuron | Metaflumizone |
| 83 | Cyantraniliprole | Chlorfluazuron | Spirodiclofen |
| 84 | Cyantraniliprole | Chlorfluazuron | Spirotetramet |
| 85 | Cyantraniliprole | Chlorfluazuron | Flonicamid |
| 86 | Cyantraniliprole | Chlorfluazuron | Eugenol |
| 87 | Cyantraniliprole | Chlorfluazuron | Neem oil |
| 88 | Cyantraniliprole | Chlorfluazuron | Citronella |
| 89 | Cyclaniliprole | Chlorfluazuron | Acephate |
| 90 | Cyclaniliprole | Chlorfluazuron | Thiodicarb |
| 91 | Cyclaniliprole | Chlorfluazuron | Methomyl |
| 92 | Cyclaniliprole | Chlorfluazuron | Quinalphos |
| 93 | Cyclaniliprole | Chlorfluazuron | Dimethoate |
| 94 | Cyclaniliprole | Chlorfluazuron | Fipronil |
| 95 | Cyclaniliprole | Chlorfluazuron | Bifenthrin |
| 96 | Cyclaniliprole | Chlorfluazuron | Cyhalothrin |
| 97 | Cyclaniliprole | Chlorfluazuron | Lambda-cyhalothrin |
| 98 | Cyclaniliprole | Chlorfluazuron | Cypermethrin |
| 99 | Cyclaniliprole | Chlorfluazuron | Permethrin |
| 100 | Cyclaniliprole | Chlorfluazuron | Kappa-bifenthrin |
| 101 | Cyclaniliprole | Chlorfluazuron | Gamma-cyhalothrin |
| 102 | Cyclaniliprole | Chlorfluazuron | Alpha-cypermethrin |
| 103 | Cyclaniliprole | Chlorfluazuron | Beta-cypermethrin |
| 104 | Cyclaniliprole | Chlorfluazuron | Theta-cypermethrin |
| 105 | Cyclaniliprole | Chlorfluazuron | Zeta-cypermethrin |
| 106 | Cyclaniliprole | Chlorfluazuron | Acetamiprid |
| 107 | Cyclaniliprole | Chlorfluazuron | Clothianidin |
| 108 | Cyclaniliprole | Chlorfluazuron | Dinotefuran |
| 109 | Cyclaniliprole | Chlorfluazuron | Imidacloprid |
| 110 | Cyclaniliprole | Chlorfluazuron | Thiacloprid |
| 111 | Cyclaniliprole | Chlorfluazuron | Thiamethoxam |
| 112 | Cyclaniliprole | Chlorfluazuron | Sulfoxaflor |
| 113 | Cyclaniliprole | Chlorfluazuron | Spinosad |
| 114 | Cyclaniliprole | Chlorfluazuron | Abamectin |
| 115 | Cyclaniliprole | Chlorfluazuron | Emamectin benzoate |
| 116 | Cyclaniliprole | Chlorfluazuron | Pyriproxyfen |
| 117 | Cyclaniliprole | Chlorfluazuron | *Bacillus thuringiensis* |
| 118 | Cyclaniliprole | Chlorfluazuron | Azadirachtin |
| 119 | Cyclaniliprole | Chlorfluazuron | Methoxyfenozide |
| 120 | Cyclaniliprole | Chlorfluazuron | Bifenazate |
| 121 | Cyclaniliprole | Chlorfluazuron | Fenpyroximate |
| 122 | Cyclaniliprole | Chlorfluazuron | Pyridaben |
| 123 | Cyclaniliprole | Chlorfluazuron | Tebufenpyrad |
| 124 | Cyclaniliprole | Chlorfluazuron | Tolfenpyrad |
| 125 | Cyclaniliprole | Chlorfluazuron | Indoxacarb |
| 126 | Cyclaniliprole | Chlorfluazuron | Metaflumizone |
| 127 | Cyclaniliprole | Chlorfluazuron | Spirodiclofen |
| 128 | Cyclaniliprole | Chlorfluazuron | Spirotetramet |
| 129 | Cyclaniliprole | Chlorfluazuron | Flonicamid |
| 130 | Cyclaniliprole | Chlorfluazuron | Eugenol |
| 131 | Cyclaniliprole | Chlorfluazuron | Neem oil |
| 132 | Cyclaniliprole | Chlorfluazuron | Citronella |
| 133 | Flubendiamide | Chlorfluazuron | Acephate |
| 134 | Flubendiamide | Chlorfluazuron | Thiodicarb |
| 135 | Flubendiamide | Chlorfluazuron | Methomyl |
| 136 | Flubendiamide | Chlorfluazuron | Quinalphos |
| 137 | Flubendiamide | Chlorfluazuron | Dimethoate |
| 138 | Flubendiamide | Chlorfluazuron | Fipronil |
| 139 | Flubendiamide | Chlorfluazuron | Bifenthrin |
| 140 | Flubendiamide | Chlorfluazuron | Cyhalothrin |
| 141 | Flubendiamide | Chlorfluazuron | Lambda-cyhalothrin |
| 142 | Flubendiamide | Chlorfluazuron | Cypermethrin |
| 143 | Flubendiamide | Chlorfluazuron | Permethrin |
| 144 | Flubendiamide | Chlorfluazuron | Kappa-bifenthrin |
| 145 | Flubendiamide | Chlorfluazuron | Gamma-cyhalothrin |
| 146 | Flubendiamide | Chlorfluazuron | Alpha-cypermethrin |
| 147 | Flubendiamide | Chlorfluazuron | Beta-cypermethrin |
| 148 | Flubendiamide | Chlorfluazuron | Theta-cypermethrin |
| 149 | Flubendiamide | Chlorfluazuron | Zeta-cypermethrin |
| 150 | Flubendiamide | Chlorfluazuron | Acetamiprid |
| 151 | Flubendiamide | Chlorfluazuron | Clothianidin |
| 152 | Flubendiamide | Chlorfluazuron | Dinotefuran |
| 153 | Flubendiamide | Chlorfluazuron | Imidacloprid |
| 154 | Flubendiamide | Chlorfluazuron | Thiacloprid |
| 155 | Flubendiamide | Chlorfluazuron | Thiamethoxam |
| 156 | Flubendiamide | Chlorfluazuron | Sulfoxaflor |
| 157 | Flubendiamide | Chlorfluazuron | Spinosad |
| 158 | Flubendiamide | Chlorfluazuron | Abamectin |
| 159 | Flubendiamide | Chlorfluazuron | Emamectin benzoate |
| 160 | Flubendiamide | Chlorfluazuron | Pyriproxyfen |
| 161 | Flubendiamide | Chlorfluazuron | *Bacillus thuringiensis* |
| 162 | Flubendiamide | Chlorfluazuron | Azadirachtin |
| 163 | Flubendiamide | Chlorfluazuron | Methoxyfenozide |
| 164 | Flubendiamide | Chlorfluazuron | Bifenazate |
| 165 | Flubendiamide | Chlorfluazuron | Fenpyroximate |
| 166 | Flubendiamide | Chlorfluazuron | Pyridaben |
| 167 | Flubendiamide | Chlorfluazuron | Tebufenpyrad |
| 168 | Flubendiamide | Chlorfluazuron | Tolfenpyrad |
| 169 | Flubendiamide | Chlorfluazuron | Indoxacarb |
| 170 | Flubendiamide | Chlorfluazuron | Metaflumizone |
| 171 | Flubendiamide | Chlorfluazuron | Spirodiclofen |
| 172 | Flubendiamide | Chlorfluazuron | Spirotetramet |
| 173 | Flubendiamide | Chlorfluazuron | Flonicamid |
| 174 | Flubendiamide | Chlorfluazuron | Eugenol |
| 175 | Flubendiamide | Chlorfluazuron | Neem oil |
| 176 | Flubendiamide | Chlorfluazuron | Citronella |
| 177 | Broflanilide | Chlorfluazuron | Acephate |
| 178 | Broflanilide | Chlorfluazuron | Thiodicarb |
| 179 | Broflanilide | Chlorfluazuron | Methomyl |
| 180 | Broflanilide | Chlorfluazuron | Quinalphos |
| 181 | Broflanilide | Chlorfluazuron | Dimethoate |
| 182 | Broflanilide | Chlorfluazuron | Fipronil |
| 183 | Broflanilide | Chlorfluazuron | Bifenthrin |
| 184 | Broflanilide | Chlorfluazuron | Cyhalothrin |
| 185 | Broflanilide | Chlorfluazuron | Lambda-cyhalothrin |
| 186 | Broflanilide | Chlorfluazuron | Cypermethrin |
| 187 | Broflanilide | Chlorfluazuron | Permethrin |
| 188 | Broflanilide | Chlorfluazuron | Kappa-bifenthrin |
| 189 | Broflanilide | Chlorfluazuron | Gamma-cyhalothrin |
| 190 | Broflanilide | Chlorfluazuron | Alpha-cypermethrin |
| 191 | Broflanilide | Chlorfluazuron | Beta-cypermethrin |

TABLE 1-continued

| S No. | Diamide compound | Benzoylphenyl urea | Third insecticide |
|---|---|---|---|
| 192 | Broflanilide | Chlorfluazuron | Theta-cypermethrin |
| 193 | Broflanilide | Chlorfluazuron | Zeta-cypermethrin |
| 194 | Broflanilide | Chlorfluazuron | Acetamiprid |
| 195 | Broflanilide | Chlorfluazuron | Clothianidin |
| 196 | Broflanilide | Chlorfluazuron | Dinotefuran |
| 197 | Broflanilide | Chlorfluazuron | Imidacloprid |
| 198 | Broflanilide | Chlorfluazuron | Thiacloprid |
| 199 | Broflanilide | Chlorfluazuron | Thiamethoxam |
| 200 | Broflanilide | Chlorfluazuron | Sulfoxaflor |
| 201 | Broflanilide | Chlorfluazuron | Spinosad |
| 202 | Broflanilide | Chlorfluazuron | Abamectin |
| 203 | Broflanilide | Chlorfluazuron | Emamectin benzoate |
| 204 | Broflanilide | Chlorfluazuron | Pyriproxyfen |
| 205 | Broflanilide | Chlorfluazuron | *Bacillus thuringiensis* |
| 206 | Broflanilide | Chlorfluazuron | Azadirachtin |
| 207 | Broflanilide | Chlorfluazuron | Methoxyfenozide |
| 208 | Broflanilide | Chlorfluazuron | Bifenazate |
| 209 | Broflanilide | Chlorfluazuron | Fenpyroximate |
| 210 | Broflanilide | Chlorfluazuron | Pyridaben |
| 211 | Broflanilide | Chlorfluazuron | Tebufenpyrad |
| 212 | Broflanilide | Chlorfluazuron | Tolfenpyrad |
| 213 | Broflanilide | Chlorfluazuron | Indoxacarb |
| 214 | Broflanilide | Chlorfluazuron | Metaflumizone |
| 215 | Broflanilide | Chlorfluazuron | Spirodiclofen |
| 216 | Broflanilide | Chlorfluazuron | Spirotetramet |
| 217 | Broflanilide | Chlorfluazuron | Flonicamid |
| 218 | Broflanilide | Chlorfluazuron | Eugenol |
| 219 | Broflanilide | Chlorfluazuron | Neem oil |
| 220 | Broflanilide | Chlorfluazuron | Citronella |
| 221 | Cyhalodiamide | Chlorfluazuron | Acephate |
| 222 | Cyhalodiamide | Chlorfluazuron | Thiodicarb |
| 223 | Cyhalodiamide | Chlorfluazuron | Methomyl |
| 224 | Cyhalodiamide | Chlorfluazuron | Quinalphos |
| 225 | Cyhalodiamide | Chlorfluazuron | Dimethoate |
| 226 | Cyhalodiamide | Chlorfluazuron | Fipronil |
| 227 | Cyhalodiamide | Chlorfluazuron | Bifenthrin |
| 228 | Cyhalodiamide | Chlorfluazuron | Cyhalothrin |
| 229 | Cyhalodiamide | Chlorfluazuron | Lambda-cyhalothrin |
| 230 | Cyhalodiamide | Chlorfluazuron | Cypermethrin |
| 231 | Cyhalodiamide | Chlorfluazuron | Permethrin |
| 232 | Cyhalodiamide | Chlorfluazuron | Kappa-bifenthrin |
| 233 | Cyhalodiamide | Chlorfluazuron | Gamma-cyhalothrin |
| 234 | Cyhalodiamide | Chlorfluazuron | Alpha-cypermethrin |
| 235 | Cyhalodiamide | Chlorfluazuron | Beta-cypermethrin |
| 236 | Cyhalodiamide | Chlorfluazuron | Theta-cypermethrin |
| 237 | Cyhalodiamide | Chlorfluazuron | Zeta-cypermethrin |
| 238 | Cyhalodiamide | Chlorfluazuron | Acetamiprid |
| 239 | Cyhalodiamide | Chlorfluazuron | Clothianidin |
| 240 | Cyhalodiamide | Chlorfluazuron | Dinotefuran |
| 241 | Cyhalodiamide | Chlorfluazuron | Imidacloprid |
| 242 | Cyhalodiamide | Chlorfluazuron | Thiacloprid |
| 243 | Cyhalodiamide | Chlorfluazuron | Thiamethoxam |
| 244 | Cyhalodiamide | Chlorfluazuron | Sulfoxaflor |
| 245 | Cyhalodiamide | Chlorfluazuron | Spinosad |
| 246 | Cyhalodiamide | Chlorfluazuron | Abamectin |
| 247 | Cyhalodiamide | Chlorfluazuron | Emamectin benzoate |
| 248 | Cyhalodiamide | Chlorfluazuron | Pyriproxyfen |
| 249 | Cyhalodiamide | Chlorfluazuron | *Bacillus thuringiensis* |
| 250 | Cyhalodiamide | Chlorfluazuron | Azadirachtin |
| 251 | Cyhalodiamide | Chlorfluazuron | Methoxyfenozide |
| 252 | Cyhalodiamide | Chlorfluazuron | Bifenazate |
| 253 | Cyhalodiamide | Chlorfluazuron | Fenpyroximate |
| 254 | Cyhalodiamide | Chlorfluazuron | Pyridaben |
| 255 | Cyhalodiamide | Chlorfluazuron | Tebufenpyrad |
| 256 | Cyhalodiamide | Chlorfluazuron | Tolfenpyrad |
| 257 | Cyhalodiamide | Chlorfluazuron | Indoxacarb |
| 258 | Cyhalodiamide | Chlorfluazuron | Metaflumizone |
| 259 | Cyhalodiamide | Chlorfluazuron | Spirodiclofen |
| 260 | Cyhalodiamide | Chlorfluazuron | Spirotetramet |
| 261 | Cyhalodiamide | Chlorfluazuron | Flonicamid |
| 262 | Cyhalodiamide | Chlorfluazuron | Eugenol |
| 263 | Cyhalodiamide | Chlorfluazuron | Neem oil |
| 264 | Cyhalodiamide | Chlorfluazuron | Citronella |
| 265 | Tetrachlorantraniliprole | Chlorfluazuron | Acephate |
| 266 | Tetrachlorantraniliprole | Chlorfluazuron | Thiodicarb |
| 267 | Tetrachlorantraniliprole | Chlorfluazuron | Methomyl |
| 268 | Tetrachlorantraniliprole | Chlorfluazuron | Quinalphos |
| 269 | Tetrachlorantraniliprole | Chlorfluazuron | Dimethoate |

TABLE 1-continued

| S No. | Diamide compound | Benzoylphenyl urea | Third insecticide |
|---|---|---|---|
| 270 | Tetrachlorantraniliprole | Chlorfluazuron | Fipronil |
| 271 | Tetrachlorantraniliprole | Chlorfluazuron | Bifenthrin |
| 272 | Tetrachlorantraniliprole | Chlorfluazuron | Cyhalothrin |
| 273 | Tetrachlorantraniliprole | Chlorfluazuron | Lambda-cyhalothrin |
| 274 | Tetrachlorantraniliprole | Chlorfluazuron | Cypermethrin |
| 275 | Tetrachlorantraniliprole | Chlorfluazuron | Permethrin |
| 276 | Tetrachlorantraniliprole | Chlorfluazuron | Kappa-bifenthrin |
| 277 | Tetrachlorantraniliprole | Chlorfluazuron | Gamma-cyhalothrin |
| 278 | Tetrachlorantraniliprole | Chlorfluazuron | Alpha-cypermethrin |
| 279 | Tetrachlorantraniliprole | Chlorfluazuron | Beta-cypermethrin |
| 280 | Tetrachlorantraniliprole | Chlorfluazuron | Theta-cypermethrin |
| 281 | Tetrachlorantraniliprole | Chlorfluazuron | Zeta-cypermethrin |
| 282 | Tetrachlorantraniliprole | Chlorfluazuron | Acetamiprid |
| 283 | Tetrachlorantraniliprole | Chlorfluazuron | Clothianidin |
| 284 | Tetrachlorantraniliprole | Chlorfluazuron | Dinotefuran |
| 285 | Tetrachlorantraniliprole | Chlorfluazuron | Imidacloprid |
| 286 | Tetrachlorantraniliprole | Chlorfluazuron | Thiacloprid |
| 287 | Tetrachlorantraniliprole | Chlorfluazuron | Thiamethoxam |
| 288 | Tetrachlorantraniliprole | Chlorfluazuron | Sulfoxaflor |
| 289 | Tetrachlorantraniliprole | Chlorfluazuron | Spinosad |
| 290 | Tetrachlorantraniliprole | Chlorfluazuron | Abamectin |
| 291 | Tetrachlorantraniliprole | Chlorfluazuron | Emamectin benzoate |
| 292 | Tetrachlorantraniliprole | Chlorfluazuron | Pyriproxyfen |
| 293 | Tetrachlorantraniliprole | Chlorfluazuron | *Bacillus thuringiensis* |
| 294 | Tetrachlorantraniliprole | Chlorfluazuron | Azadirachtin |
| 295 | Tetrachlorantraniliprole | Chlorfluazuron | Methoxyfenozide |
| 296 | Tetrachlorantraniliprole | Chlorfluazuron | Bifenazate |
| 297 | Tetrachlorantraniliprole | Chlorfluazuron | Fenpyroximate |
| 298 | Tetrachlorantraniliprole | Chlorfluazuron | Pyridaben |
| 299 | Tetrachlorantraniliprole | Chlorfluazuron | Tebufenpyrad |
| 300 | Tetrachlorantraniliprole | Chlorfluazuron | Tolfenpyrad |
| 301 | Tetrachlorantraniliprole | Chlorfluazuron | Indoxacarb |
| 302 | Tetrachlorantraniliprole | Chlorfluazuron | Metaflumizone |
| 303 | Tetrachlorantraniliprole | Chlorfluazuron | Spirodiclofen |
| 304 | Tetrachlorantraniliprole | Chlorfluazuron | Spirotetramet |
| 305 | Tetrachlorantraniliprole | Chlorfluazuron | Flonicamid |
| 306 | Tetrachlorantraniliprole | Chlorfluazuron | Eugenol |
| 307 | Tetrachlorantraniliprole | Chlorfluazuron | Neem oil |
| 308 | Tetrachlorantraniliprole | Chlorfluazuron | Citronella |
| 309 | Tyclopyrazoflor | Chlorfluazuron | Acephate |
| 310 | Tyclopyrazoflor | Chlorfluazuron | Thiodicarb |
| 311 | Tyclopyrazoflor | Chlorfluazuron | Methomyl |
| 312 | Tyclopyrazoflor | Chlorfluazuron | Quinalphos |
| 313 | Tyclopyrazoflor | Chlorfluazuron | Dimethoate |
| 314 | Tyclopyrazoflor | Chlorfluazuron | Fipronil |
| 315 | Tyclopyrazoflor | Chlorfluazuron | Bifenthrin |
| 316 | Tyclopyrazoflor | Chlorfluazuron | Cyhalothrin |
| 317 | Tyclopyrazoflor | Chlorfluazuron | Lambda-cyhalothrin |
| 318 | Tyclopyrazoflor | Chlorfluazuron | Cypermethrin |
| 319 | Tyclopyrazoflor | Chlorfluazuron | Permethrin |
| 320 | Tyclopyrazoflor | Chlorfluazuron | Kappa-bifenthrin |
| 321 | Tyclopyrazoflor | Chlorfluazuron | Gamma-cyhalothrin |
| 322 | Tyclopyrazoflor | Chlorfluazuron | Alpha-cypermethrin |
| 323 | Tyclopyrazoflor | Chlorfluazuron | Beta-cypermethrin |
| 324 | Tyclopyrazoflor | Chlorfluazuron | Theta-cypermethrin |
| 325 | Tyclopyrazoflor | Chlorfluazuron | Zeta-cypermethrin |
| 326 | Tyclopyrazoflor | Chlorfluazuron | Acetamiprid |
| 327 | Tyclopyrazoflor | Chlorfluazuron | Clothianidin |
| 328 | Tyclopyrazoflor | Chlorfluazuron | Dinotefuran |
| 329 | Tyclopyrazoflor | Chlorfluazuron | Imidacloprid |
| 330 | Tyclopyrazoflor | Chlorfluazuron | Thiacloprid |
| 331 | Tyclopyrazoflor | Chlorfluazuron | Thiamethoxam |
| 332 | Tyclopyrazoflor | Chlorfluazuron | Sulfoxaflor |
| 333 | Tyclopyrazoflor | Chlorfluazuron | Spinosad |
| 334 | Tyclopyrazoflor | Chlorfluazuron | Abamectin |
| 335 | Tyclopyrazoflor | Chlorfluazuron | Emamectin benzoate |
| 336 | Tyclopyrazoflor | Chlorfluazuron | Pyriproxyfen |
| 337 | Tyclopyrazoflor | Chlorfluazuron | *Bacillus thuringiensis* |
| 338 | Tyclopyrazoflor | Chlorfluazuron | Azadirachtin |
| 339 | Tyclopyrazoflor | Chlorfluazuron | Methoxyfenozide |
| 340 | Tyclopyrazoflor | Chlorfluazuron | Bifenazate |
| 341 | Tyclopyrazoflor | Chlorfluazuron | Fenpyroximate |
| 342 | Tyclopyrazoflor | Chlorfluazuron | Pyridaben |
| 343 | Tyclopyrazoflor | Chlorfluazuron | Tebufenpyrad |
| 344 | Tyclopyrazoflor | Chlorfluazuron | Tolfenpyrad |
| 345 | Tyclopyrazoflor | Chlorfluazuron | Indoxacarb |
| 346 | Tyclopyrazoflor | Chlorfluazuron | Metaflumizone |
| 347 | Tyclopyrazoflor | Chlorfluazuron | Spirodiclofen |

TABLE 1-continued

| S No. | Diamide compound | Benzoylphenyl urea | Third insecticide |
|---|---|---|---|
| 348 | Tyclopyrazoflor | Chlorfluazuron | Spirotetramet |
| 349 | Tyclopyrazoflor | Chlorfluazuron | Flonicamid |
| 350 | Tyclopyrazoflor | Chlorfluazuron | Eugenol |
| 351 | Tyclopyrazoflor | Chlorfluazuron | Neem oil |
| 352 | Tyclopyrazoflor | Chlorfluazuron | Citronella |
| 353 | Tetraniliprole | Chlorfluazuron | Acephate |
| 354 | Tetraniliprole | Chlorfluazuron | Thiodicarb |
| 355 | Tetraniliprole | Chlorfluazuron | Methomyl |
| 356 | Tetraniliprole | Chlorfluazuron | Quinalphos |
| 357 | Tetraniliprole | Chlorfluazuron | Dimethoate |
| 358 | Tetraniliprole | Chlorfluazuron | Fipronil |
| 359 | Tetraniliprole | Chlorfluazuron | Bifenthrin |
| 360 | Tetraniliprole | Chlorfluazuron | Cyhalothrin |
| 361 | Tetraniliprole | Chlorfluazuron | Lambda-cyhalothrin |
| 362 | Tetraniliprole | Chlorfluazuron | Cypermethrin |
| 363 | Tetraniliprole | Chlorfluazuron | Permethrin |
| 364 | Tetraniliprole | Chlorfluazuron | Kappa-bifenthrin |
| 365 | Tetraniliprole | Chlorfluazuron | Gamma-cyhalothrin |
| 366 | Tetraniliprole | Chlorfluazuron | Alpha-cypermethrin |
| 367 | Tetraniliprole | Chlorfluazuron | Beta-cypermethrin |
| 368 | Tetraniliprole | Chlorfluazuron | Theta-cypermethrin |
| 369 | Tetraniliprole | Chlorfluazuron | Zeta-cypermethrin |
| 370 | Tetraniliprole | Chlorfluazuron | Acetamiprid |
| 371 | Tetraniliprole | Chlorfluazuron | Clothianidin |
| 372 | Tetraniliprole | Chlorfluazuron | Dinotefuran |
| 373 | Tetraniliprole | Chlorfluazuron | Imidacloprid |
| 374 | Tetraniliprole | Chlorfluazuron | Thiacloprid |
| 375 | Tetraniliprole | Chlorfluazuron | Thiamethoxam |
| 376 | Tetraniliprole | Chlorfluazuron | Sulfoxaflor |
| 377 | Tetraniliprole | Chlorfluazuron | Spinosad |
| 378 | Tetraniliprole | Chlorfluazuron | Abamectin |
| 379 | Tetraniliprole | Chlorfluazuron | Emamectin benzoate |
| 380 | Tetraniliprole | Chlorfluazuron | Pyriproxyfen |
| 381 | Tetraniliprole | Chlorfluazuron | *Bacillus thuringiensis* |
| 382 | Tetraniliprole | Chlorfluazuron | Azadirachtin |
| 383 | Tetraniliprole | Chlorfluazuron | Methoxyfenozide |
| 384 | Tetraniliprole | Chlorfluazuron | Bifenazate |
| 385 | Tetraniliprole | Chlorfluazuron | Fenpyroximate |
| 386 | Tetraniliprole | Chlorfluazuron | Pyridaben |
| 387 | Tetraniliprole | Chlorfluazuron | Tebufenpyrad |
| 388 | Tetraniliprole | Chlorfluazuron | Tolfenpyrad |
| 389 | Tetraniliprole | Chlorfluazuron | Indoxacarb |
| 390 | Tetraniliprole | Chlorfluazuron | Metaflumizone |
| 391 | Tetraniliprole | Chlorfluazuron | Spirodiclofen |
| 392 | Tetraniliprole | Chlorfluazuron | Spirotetramet |
| 393 | Tetraniliprole | Chlorfluazuron | Flonicamid |
| 394 | Tetraniliprole | Chlorfluazuron | Eugenol |
| 395 | Tetraniliprole | Chlorfluazuron | Neem oil |
| 396 | Tetraniliprole | Chlorfluazuron | Citronella |
| 397 | Chlorantraniliprole | Novaluron | Acephate |
| 398 | Chlorantraniliprole | Novaluron | Thiodicarb |
| 399 | Chlorantraniliprole | Novaluron | Methomyl |
| 400 | Chlorantraniliprole | Novaluron | Quinalphos |
| 401 | Chlorantraniliprole | Novaluron | Dimethoate |
| 402 | Chlorantraniliprole | Novaluron | Fipronil |
| 403 | Chlorantraniliprole | Novaluron | Bifenthrin |
| 404 | Chlorantraniliprole | Novaluron | Cyhalothrin |
| 405 | Chlorantraniliprole | Novaluron | Lambda-cyhalothrin |
| 406 | Chlorantraniliprole | Novaluron | Cypermethrin |
| 407 | Chlorantraniliprole | Novaluron | Permethrin |
| 408 | Chlorantraniliprole | Novaluron | Kappa-bifenthrin |
| 409 | Chlorantraniliprole | Novaluron | Gamma-cyhalothrin |
| 410 | Chlorantraniliprole | Novaluron | Alpha-cypermethrin |
| 411 | Chlorantraniliprole | Novaluron | Beta-cypermethrin |
| 412 | Chlorantraniliprole | Novaluron | Theta-cypermethrin |
| 413 | Chlorantraniliprole | Novaluron | Zeta-cypermethrin |
| 414 | Chlorantraniliprole | Novaluron | Acetamiprid |
| 415 | Chlorantraniliprole | Novaluron | Clothianidin |
| 416 | Chlorantraniliprole | Novaluron | Dinotefuran |
| 417 | Chlorantraniliprole | Novaluron | Imidacloprid |
| 418 | Chlorantraniliprole | Novaluron | Thiacloprid |
| 419 | Chlorantraniliprole | Novaluron | Thiamethoxam |
| 420 | Chlorantraniliprole | Novaluron | Sulfoxaflor |
| 421 | Chlorantraniliprole | Novaluron | Spinosad |
| 422 | Chlorantraniliprole | Novaluron | Abamectin |
| 423 | Chlorantraniliprole | Novaluron | Emamectin benzoate |
| 424 | Chlorantraniliprole | Novaluron | Pyriproxyfen |
| 425 | Chlorantraniliprole | Novaluron | *Bacillus thuringiensis* |
| 416 | Chlorantraniliprole | Novaluron | Azadirachtin |
| 427 | Chlorantraniliprole | Novaluron | Methoxyfenozide |
| 428 | Chlorantraniliprole | Novaluron | Bifenazate |
| 429 | Chlorantraniliprole | Novaluron | Fenpyroximate |
| 430 | Chlorantraniliprole | Novaluron | Pyridaben |
| 431 | Chlorantraniliprole | Novaluron | Tebufenpyrad |
| 432 | Chlorantraniliprole | Novaluron | Tolfenpyrad |
| 433 | Chlorantraniliprole | Novaluron | Indoxacarb |
| 434 | Chlorantraniliprole | Novaluron | Metaflumizone |
| 435 | Chlorantraniliprole | Novaluron | Spirodiclofen |
| 436 | Chlorantraniliprole | Novaluron | Spirotetramet |
| 437 | Chlorantraniliprole | Novaluron | Flonicamid |
| 438 | Chlorantraniliprole | Novaluron | Eugenol |
| 439 | Chlorantraniliprole | Novaluron | Neem oil |
| 440 | Chlorantraniliprole | Novaluron | Citronella |
| 441 | Cyantraniliprole | Novaluron | Acephate |
| 442 | Cyantraniliprole | Novaluron | Thiodicarb |
| 443 | Cyantraniliprole | Novaluron | Methomyl |
| 444 | Cyantraniliprole | Novaluron | Quinalphos |
| 445 | Cyantraniliprole | Novaluron | Dimethoate |
| 446 | Cyantraniliprole | Novaluron | Fipronil |
| 447 | Cyantraniliprole | Novaluron | Bifenthrin |
| 448 | Cyantraniliprole | Novaluron | Cyhalothrin |
| 449 | Cyantraniliprole | Novaluron | Lambda-cyhalothrin |
| 450 | Cyantraniliprole | Novaluron | Cypermethrin |
| 451 | Cyantraniliprole | Novaluron | Permethrin |
| 452 | Cyantraniliprole | Novaluron | Kappa-bifenthrin |
| 453 | Cyantraniliprole | Novaluron | Gamma-cyhalothrin |
| 454 | Cyantraniliprole | Novaluron | Alpha-cypermethrin |
| 455 | Cyantraniliprole | Novaluron | Beta-cypermethrin |
| 456 | Cyantraniliprole | Novaluron | Theta-cypermethrin |
| 457 | Cyantraniliprole | Novaluron | Zeta-cypermethrin |
| 458 | Cyantraniliprole | Novaluron | Acetamiprid |
| 459 | Cyantraniliprole | Novaluron | Clothianidin |
| 460 | Cyantraniliprole | Novaluron | Dinotefuran |
| 461 | Cyantraniliprole | Novaluron | Imidacloprid |
| 462 | Cyantraniliprole | Novaluron | Thiacloprid |
| 463 | Cyantraniliprole | Novaluron | Thiamethoxam |
| 464 | Cyantraniliprole | Novaluron | Sulfoxaflor |
| 465 | Cyantraniliprole | Novaluron | Spinosad |
| 466 | Cyantraniliprole | Novaluron | Abamectin |
| 467 | Cyantraniliprole | Novaluron | Emamectin benzoate |
| 468 | Cyantraniliprole | Novaluron | Pyriproxyfen |
| 469 | Cyantraniliprole | Novaluron | *Bacillus thuringiensis* |
| 470 | Cyantraniliprole | Novaluron | Azadirachtin |
| 471 | Cyantraniliprole | Novaluron | Methoxyfenozide |
| 472 | Cyantraniliprole | Novaluron | Bifenazate |
| 473 | Cyantraniliprole | Novaluron | Fenpyroximate |
| 474 | Cyantraniliprole | Novaluron | Pyridaben |
| 475 | Cyantraniliprole | Novaluron | Tebufenpyrad |
| 476 | Cyantraniliprole | Novaluron | Tolfenpyrad |
| 477 | Cyantraniliprole | Novaluron | Indoxacarb |
| 478 | Cyantraniliprole | Novaluron | Metaflumizone |
| 479 | Cyantraniliprole | Novaluron | Spirodiclofen |
| 480 | Cyantraniliprole | Novaluron | Spirotetramet |
| 481 | Cyantraniliprole | Novaluron | Flonicamid |
| 482 | Cyantraniliprole | Novaluron | Eugenol |
| 483 | Cyantraniliprole | Novaluron | Neem oil |
| 484 | Cyantraniliprole | Novaluron | Citronella |
| 485 | Cyclaniliprole | Novaluron | Acephate |
| 486 | Cyclaniliprole | Novaluron | Thiodicarb |
| 487 | Cyclaniliprole | Novaluron | Methomyl |
| 488 | Cyclaniliprole | Novaluron | Quinalphos |
| 489 | Cyclaniliprole | Novaluron | Dimethoate |
| 490 | Cyclaniliprole | Novaluron | Fipronil |
| 491 | Cyclaniliprole | Novaluron | Bifenthrin |
| 492 | Cyclaniliprole | Novaluron | Cyhalothrin |
| 493 | Cyclaniliprole | Novaluron | Lambda-cyhalothrin |
| 494 | Cyclaniliprole | Novaluron | Cypermethrin |
| 495 | Cyclaniliprole | Novaluron | Permethrin |
| 496 | Cyclaniliprole | Novaluron | Kappa-bifenthrin |
| 497 | Cyclaniliprole | Novaluron | Gamma-cyhalothrin |
| 498 | Cyclaniliprole | Novaluron | Alpha-cypermethrin |
| 499 | Cyclaniliprole | Novaluron | Beta-cypermethrin |
| 500 | Cyclaniliprole | Novaluron | Theta-cypermethrin |
| 501 | Cyclaniliprole | Novaluron | Zeta-cypermethrin |
| 502 | Cyclaniliprole | Novaluron | Acetamiprid |
| 503 | Cyclaniliprole | Novaluron | Clothianidin |

TABLE 1-continued

| S No. | Diamide compound | Benzoylphenyl urea | Third insecticide |
|---|---|---|---|
| 504 | Cyclaniliprole | Novaluron | Dinotefuran |
| 505 | Cyclaniliprole | Novaluron | Imidacloprid |
| 506 | Cyclaniliprole | Novaluron | Thiacloprid |
| 507 | Cyclaniliprole | Novaluron | Thiamethoxam |
| 508 | Cyclaniliprole | Novaluron | Sulfoxaflor |
| 509 | Cyclaniliprole | Novaluron | Spinosad |
| 510 | Cyclaniliprole | Novaluron | Abamectin |
| 511 | Cyclaniliprole | Novaluron | Emamectin benzoate |
| 512 | Cyclaniliprole | Novaluron | Pyriproxyfen |
| 513 | Cyclaniliprole | Novaluron | *Bacillus thuringiensis* |
| 514 | Cyclaniliprole | Novaluron | Azadirachtin |
| 515 | Cyclaniliprole | Novaluron | Methoxyfenozide |
| 516 | Cyclaniliprole | Novaluron | Bifenazate |
| 517 | Cyclaniliprole | Novaluron | Fenpyroximate |
| 518 | Cyclaniliprole | Novaluron | Pyridaben |
| 519 | Cyclaniliprole | Novaluron | Tebufenpyrad |
| 520 | Cyclaniliprole | Novaluron | Tolfenpyrad |
| 521 | Cyclaniliprole | Novaluron | Indoxacarb |
| 522 | Cyclaniliprole | Novaluron | Metaflumizone |
| 523 | Cyclaniliprole | Novaluron | Spirodiclofen |
| 524 | Cyclaniliprole | Novaluron | Spirotetramet |
| 525 | Cyclaniliprole | Novaluron | Flonicamid |
| 526 | Cyclaniliprole | Novaluron | Eugenol |
| 527 | Cyclaniliprole | Novaluron | Neem oil |
| 528 | Cyclaniliprole | Novaluron | Citronella |
| 529 | Flubendiamide | Novaluron | Acephate |
| 530 | Flubendiamide | Novaluron | Thiodicarb |
| 531 | Flubendiamide | Novaluron | Methomyl |
| 532 | Flubendiamide | Novaluron | Quinalphos |
| 533 | Flubendiamide | Novaluron | Dimethoate |
| 534 | Flubendiamide | Novaluron | Fipronil |
| 535 | Flubendiamide | Novaluron | Bifenthrin |
| 536 | Flubendiamide | Novaluron | Cyhalothrin |
| 537 | Flubendiamide | Novaluron | Lambda-cyhalothrin |
| 538 | Flubendiamide | Novaluron | Cypermethrin |
| 539 | Flubendiamide | Novaluron | Permethrin |
| 540 | Flubendiamide | Novaluron | Kappa-bifenthrin |
| 541 | Flubendiamide | Novaluron | Gamma-cyhalothrin |
| 542 | Flubendiamide | Novaluron | Alpha-cypermethrin |
| 543 | Flubendiamide | Novaluron | Beta-cypermethrin |
| 544 | Flubendiamide | Novaluron | Theta-cypermethrin |
| 545 | Flubendiamide | Novaluron | Zeta-cypermethrin |
| 546 | Flubendiamide | Novaluron | Acetamiprid |
| 547 | Flubendiamide | Novaluron | Clothianidin |
| 548 | Flubendiamide | Novaluron | Dinotefuran |
| 549 | Flubendiamide | Novaluron | Imidacloprid |
| 550 | Flubendiamide | Novaluron | Thiacloprid |
| 551 | Flubendiamide | Novaluron | Thiamethoxam |
| 552 | Flubendiamide | Novaluron | Sulfoxaflor |
| 553 | Flubendiamide | Novaluron | Spinosad |
| 554 | Flubendiamide | Novaluron | Abamectin |
| 555 | Flubendiamide | Novaluron | Emamectin benzoate |
| 556 | Flubendiamide | Novaluron | Pyriproxyfen |
| 557 | Flubendiamide | Novaluron | *Bacillus thuringiensis* |
| 558 | Flubendiamide | Novaluron | Azadirachtin |
| 559 | Flubendiamide | Novaluron | Methoxyfenozide |
| 560 | Flubendiamide | Novaluron | Bifenazate |
| 561 | Flubendiamide | Novaluron | Fenpyroximate |
| 562 | Flubendiamide | Novaluron | Pyridaben |
| 563 | Flubendiamide | Novaluron | Tebufenpyrad |
| 564 | Flubendiamide | Novaluron | Tolfenpyrad |
| 565 | Flubendiamide | Novaluron | Indoxacarb |
| 566 | Flubendiamide | Novaluron | Metaflumizone |
| 567 | Flubendiamide | Novaluron | Spirodiclofen |
| 568 | Flubendiamide | Novaluron | Spirotetramet |
| 569 | Flubendiamide | Novaluron | Flonicamid |
| 570 | Flubendiamide | Novaluron | Eugenol |
| 571 | Flubendiamide | Novaluron | Neem oil |
| 572 | Flubendiamide | Novaluron | Citronella |
| 573 | Broflanilide | Novaluron | Acephate |
| 574 | Broflanilide | Novaluron | Thiodicarb |
| 575 | Broflanilide | Novaluron | Methomyl |
| 576 | Broflanilide | Novaluron | Quinalphos |
| 577 | Broflanilide | Novaluron | Dimethoate |
| 578 | Broflanilide | Novaluron | Fipronil |
| 579 | Broflanilide | Novaluron | Bifenthrin |
| 580 | Broflanilide | Novaluron | Cyhalothrin |
| 581 | Broflanilide | Novaluron | Lambda-cyhalothrin |
| 582 | Broflanilide | Novaluron | Cypermethrin |
| 583 | Broflanilide | Novaluron | Permethrin |
| 584 | Broflanilide | Novaluron | Kappa-bifenthrin |
| 585 | Broflanilide | Novaluron | Gamma-cyhalothrin |
| 586 | Broflanilide | Novaluron | Alpha-cypermethrin |
| 587 | Broflanilide | Novaluron | Beta-cypermethrin |
| 588 | Broflanilide | Novaluron | Theta-cypermethrin |
| 589 | Broflanilide | Novaluron | Zeta-cypermethrin |
| 590 | Broflanilide | Novaluron | Acetamiprid |
| 591 | Broflanilide | Novaluron | Clothianidin |
| 592 | Broflanilide | Novaluron | Dinotefuran |
| 593 | Broflanilide | Novaluron | Imidacloprid |
| 594 | Broflanilide | Novaluron | Thiacloprid |
| 595 | Broflanilide | Novaluron | Thiamethoxam |
| 596 | Broflanilide | Novaluron | Sulfoxaflor |
| 597 | Broflanilide | Novaluron | Spinosad |
| 598 | Broflanilide | Novaluron | Abamectin |
| 599 | Broflanilide | Novaluron | Emamectin benzoate |
| 600 | Broflanilide | Novaluron | Pyriproxyfen |
| 601 | Broflanilide | Novaluron | *Bacillus thuringiensis* |
| 602 | Broflanilide | Novaluron | Azadirachtin |
| 603 | Broflanilide | Novaluron | Methoxyfenozide |
| 604 | Broflanilide | Novaluron | Bifenazate |
| 605 | Broflanilide | Novaluron | Fenpyroximate |
| 606 | Broflanilide | Novaluron | Pyridaben |
| 607 | Broflanilide | Novaluron | Tebufenpyrad |
| 608 | Broflanilide | Novaluron | Tolfenpyrad |
| 609 | Broflanilide | Novaluron | Indoxacarb |
| 610 | Broflanilide | Novaluron | Metaflumizone |
| 611 | Broflanilide | Novaluron | Spirodiclofen |
| 612 | Broflanilide | Novaluron | Spirotetramet |
| 613 | Broflanilide | Novaluron | Flonicamid |
| 614 | Broflanilide | Novaluron | Eugenol |
| 615 | Broflanilide | Novaluron | Neem oil |
| 616 | Broflanilide | Novaluron | Citronella |
| 617 | Cyhalodiamide | Novaluron | Acephate |
| 618 | Cyhalodiamide | Novaluron | Thiodicarb |
| 619 | Cyhalodiamide | Novaluron | Methomyl |
| 620 | Cyhalodiamide | Novaluron | Quinalphos |
| 621 | Cyhalodiamide | Novaluron | Dimethoate |
| 622 | Cyhalodiamide | Novaluron | Fipronil |
| 623 | Cyhalodiamide | Novaluron | Bifenthrin |
| 624 | Cyhalodiamide | Novaluron | Cyhalothrin |
| 625 | Cyhalodiamide | Novaluron | Lambda-cyhalothrin |
| 626 | Cyhalodiamide | Novaluron | Cypermethrin |
| 627 | Cyhalodiamide | Novaluron | Permethrin |
| 628 | Cyhalodiamide | Novaluron | Kappa-bifenthrin |
| 629 | Cyhalodiamide | Novaluron | Gamma-cyhalothrin |
| 630 | Cyhalodiamide | Novaluron | Alpha-cypermethrin |
| 631 | Cyhalodiamide | Novaluron | Beta-cypermethrin |
| 632 | Cyhalodiamide | Novaluron | Theta-cypermethrin |
| 633 | Cyhalodiamide | Novaluron | Zeta-cypermethrin |
| 634 | Cyhalodiamide | Novaluron | Acetamiprid |
| 635 | Cyhalodiamide | Novaluron | Clothianidin |
| 636 | Cyhalodiamide | Novaluron | Dinotefuran |
| 637 | Cyhalodiamide | Novaluron | Imidacloprid |
| 638 | Cyhalodiamide | Novaluron | Thiacloprid |
| 639 | Cyhalodiamide | Novaluron | Thiamethoxam |
| 640 | Cyhalodiamide | Novaluron | Sulfoxaflor |
| 641 | Cyhalodiamide | Novaluron | Spinosad |
| 642 | Cyhalodiamide | Novaluron | Abamectin |
| 643 | Cyhalodiamide | Novaluron | Emamectin benzoate |
| 644 | Cyhalodiamide | Novaluron | Pyriproxyfen |
| 645 | Cyhalodiamide | Novaluron | *Bacillus thuringiensis* |
| 646 | Cyhalodiamide | Novaluron | Azadirachtin |
| 647 | Cyhalodiamide | Novaluron | Methoxyfenozide |
| 648 | Cyhalodiamide | Novaluron | Bifenazate |
| 649 | Cyhalodiamide | Novaluron | Fenpyroximate |
| 650 | Cyhalodiamide | Novaluron | Pyridaben |
| 651 | Cyhalodiamide | Novaluron | Tebufenpyrad |
| 652 | Cyhalodiamide | Novaluron | Tolfenpyrad |
| 653 | Cyhalodiamide | Novaluron | Indoxacarb |
| 654 | Cyhalodiamide | Novaluron | Metaflumizone |
| 655 | Cyhalodiamide | Novaluron | Spirodiclofen |
| 656 | Cyhalodiamide | Novaluron | Spirotetramet |
| 657 | Cyhalodiamide | Novaluron | Flonicamid |
| 658 | Cyhalodiamide | Novaluron | Eugenol |
| 659 | Cyhalodiamide | Novaluron | Neem oil |

TABLE 1-continued

| S No. | Diamide compound | Benzoylphenyl urea | Third insecticide |
|---|---|---|---|
| 660 | Cyhalodiamide | Novaluron | Citronella |
| 661 | Tetrachlorantraniliprole | Novaluron | Acephate |
| 662 | Tetrachlorantraniliprole | Novaluron | Thiodicarb |
| 663 | Tetrachlorantraniliprole | Novaluron | Methomyl |
| 664 | Tetrachlorantraniliprole | Novaluron | Quinalphos |
| 665 | Tetrachlorantraniliprole | Novaluron | Dimethoate |
| 666 | Tetrachlorantraniliprole | Novaluron | Fipronil |
| 667 | Tetrachlorantraniliprole | Novaluron | Bifenthrin |
| 668 | Tetrachlorantraniliprole | Novaluron | Cyhalothrin |
| 669 | Tetrachlorantraniliprole | Novaluron | Lambda-cyhalothrin |
| 670 | Tetrachlorantraniliprole | Novaluron | Cypermethrin |
| 671 | Tetrachlorantraniliprole | Novaluron | Permethrin |
| 672 | Tetrachlorantraniliprole | Novaluron | Kappa-bifenthrin |
| 673 | Tetrachlorantraniliprole | Novaluron | Gamma-cyhalothrin |
| 674 | Tetrachlorantraniliprole | Novaluron | Alpha-cypermethrin |
| 675 | Tetrachlorantraniliprole | Novaluron | Beta-cypermethrin |
| 676 | Tetrachlorantraniliprole | Novaluron | Theta-cypermethrin |
| 677 | Tetrachlorantraniliprole | Novaluron | Zeta-cypermethrin |
| 678 | Tetrachlorantraniliprole | Novaluron | Acetamiprid |
| 679 | Tetrachlorantraniliprole | Novaluron | Clothianidin |
| 680 | Tetrachlorantraniliprole | Novaluron | Dinotefuran |
| 681 | Tetrachlorantraniliprole | Novaluron | Imidacloprid |
| 682 | Tetrachlorantraniliprole | Novaluron | Thiacloprid |
| 683 | Tetrachlorantraniliprole | Novaluron | Thiamethoxam |
| 684 | Tetrachlorantraniliprole | Novaluron | Sulfoxaflor |
| 685 | Tetrachlorantraniliprole | Novaluron | Spinosad |
| 686 | Tetrachlorantraniliprole | Novaluron | Abamectin |
| 687 | Tetrachlorantraniliprole | Novaluron | Emamectin benzoate |
| 688 | Tetrachlorantraniliprole | Novaluron | Pyriproxyfen |
| 689 | Tetrachlorantraniliprole | Novaluron | *Bacillus thuringiensis* |
| 690 | Tetrachlorantraniliprole | Novaluron | Azadirachtin |
| 691 | Tetrachlorantraniliprole | Novaluron | Methoxyfenozide |
| 692 | Tetrachlorantraniliprole | Novaluron | Bifenazate |
| 693 | Tetrachlorantraniliprole | Novaluron | Fenpyroximate |
| 694 | Tetrachlorantraniliprole | Novaluron | Pyridaben |
| 695 | Tetrachlorantraniliprole | Novaluron | Tebufenpyrad |
| 696 | Tetrachlorantraniliprole | Novaluron | Tolfenpyrad |
| 697 | Tetrachlorantraniliprole | Novaluron | Indoxacarb |
| 698 | Tetrachlorantraniliprole | Novaluron | Metaflumizone |
| 699 | Tetrachlorantraniliprole | Novaluron | Spirodiclofen |
| 700 | Tetrachlorantraniliprole | Novaluron | Spirotetramet |
| 701 | Tetrachlorantraniliprole | Novaluron | Flonicamid |
| 702 | Tetrachlorantraniliprole | Novaluron | Eugenol |
| 703 | Tetrachlorantraniliprole | Novaluron | Neem oil |
| 704 | Tetrachlorantraniliprole | Novaluron | Citronella |
| 705 | Tyclopyrazoflor | Novaluron | Acephate |
| 706 | Tyclopyrazoflor | Novaluron | Thiodicarb |
| 707 | Tyclopyrazoflor | Novaluron | Methomyl |
| 708 | Tyclopyrazoflor | Novaluron | Quinalphos |
| 709 | Tyclopyrazoflor | Novaluron | Dimethoate |
| 710 | Tyclopyrazoflor | Novaluron | Fipronil |
| 711 | Tyclopyrazoflor | Novaluron | Bifenthrin |
| 712 | Tyclopyrazoflor | Novaluron | Cyhalothrin |
| 713 | Tyclopyrazoflor | Novaluron | Lambda-cyhalothrin |
| 714 | Tyclopyrazoflor | Novaluron | Cypermethrin |
| 715 | Tyclopyrazoflor | Novaluron | Permethrin |
| 716 | Tyclopyrazoflor | Novaluron | Kappa-bifenthrin |
| 717 | Tyclopyrazoflor | Novaluron | Gamma-cyhalothrin |
| 718 | Tyclopyrazoflor | Novaluron | Alpha-cypermethrin |
| 719 | Tyclopyrazoflor | Novaluron | Beta-cypermethrin |
| 720 | Tyclopyrazoflor | Novaluron | Theta-cypermethrin |
| 721 | Tyclopyrazoflor | Novaluron | Zeta-cypermethrin |
| 722 | Tyclopyrazoflor | Novaluron | Acetamiprid |
| 723 | Tyclopyrazoflor | Novaluron | Clothianidin |
| 724 | Tyclopyrazoflor | Novaluron | Dinotefuran |
| 725 | Tyclopyrazoflor | Novaluron | Imidacloprid |
| 726 | Tyclopyrazoflor | Novaluron | Thiacloprid |
| 727 | Tyclopyrazoflor | Novaluron | Thiamethoxam |
| 728 | Tyclopyrazoflor | Novaluron | Sulfoxaflor |
| 729 | Tyclopyrazoflor | Novaluron | Spinosad |
| 730 | Tyclopyrazoflor | Novaluron | Abamectin |
| 731 | Tyclopyrazoflor | Novaluron | Emamectin benzoate |
| 732 | Tyclopyrazoflor | Novaluron | Pyriproxyfen |
| 733 | Tyclopyrazoflor | Novaluron | *Bacillus thuringiensis* |
| 734 | Tyclopyrazoflor | Novaluron | Azadirachtin |
| 735 | Tyclopyrazoflor | Novaluron | Methoxyfenozide |
| 736 | Tyclopyrazoflor | Novaluron | Bifenazate |
| 737 | Tyclopyrazoflor | Novaluron | Fenpyroximate |
| 738 | Tyclopyrazoflor | Novaluron | Pyridaben |
| 739 | Tyclopyrazoflor | Novaluron | Tebufenpyrad |
| 740 | Tyclopyrazoflor | Novaluron | Tolfenpyrad |
| 741 | Tyclopyrazoflor | Novaluron | Indoxacarb |
| 742 | Tyclopyrazoflor | Novaluron | Metaflumizone |
| 743 | Tyclopyrazoflor | Novaluron | Spirodiclofen |
| 744 | Tyclopyrazoflor | Novaluron | Spirotetramet |
| 745 | Tyclopyrazoflor | Novaluron | Flonicamid |
| 746 | Tyclopyrazoflor | Novaluron | Eugenol |
| 747 | Tyclopyrazoflor | Novaluron | Neem oil |
| 748 | Tyclopyrazoflor | Novaluron | Citronella |
| 749 | Tetraniliprole | Novaluron | Acephate |
| 750 | Tetraniliprole | Novaluron | Thiodicarb |
| 751 | Tetraniliprole | Novaluron | Methomyl |
| 752 | Tetraniliprole | Novaluron | Quinalphos |
| 753 | Tetraniliprole | Novaluron | Dimethoate |
| 754 | Tetraniliprole | Novaluron | Fipronil |
| 755 | Tetraniliprole | Novaluron | Bifenthrin |
| 756 | Tetraniliprole | Novaluron | Cyhalothrin |
| 757 | Tetraniliprole | Novaluron | Lambda-cyhalothrin |
| 758 | Tetraniliprole | Novaluron | Cypermethrin |
| 759 | Tetraniliprole | Novaluron | Permethrin |
| 760 | Tetraniliprole | Novaluron | Kappa-bifenthrin |
| 761 | Tetraniliprole | Novaluron | Gamma-cyhalothrin |
| 762 | Tetraniliprole | Novaluron | Alpha-cypermethrin |
| 763 | Tetraniliprole | Novaluron | Beta-cypermethrin |
| 764 | Tetraniliprole | Novaluron | Theta-cypermethrin |
| 765 | Tetraniliprole | Novaluron | Zeta-cypermethrin |
| 766 | Tetraniliprole | Novaluron | Acetamiprid |
| 767 | Tetraniliprole | Novaluron | Clothianidin |
| 768 | Tetraniliprole | Novaluron | Dinotefuran |
| 769 | Tetraniliprole | Novaluron | Imidacloprid |
| 770 | Tetraniliprole | Novaluron | Thiacloprid |
| 771 | Tetraniliprole | Novaluron | Thiamethoxam |
| 772 | Tetraniliprole | Novaluron | Sulfoxaflor |
| 773 | Tetraniliprole | Novaluron | Spinosad |
| 774 | Tetraniliprole | Novaluron | Abamectin |
| 775 | Tetraniliprole | Novaluron | Emamectin benzoate |
| 776 | Tetraniliprole | Novaluron | Pyriproxyfen |
| 777 | Tetraniliprole | Novaluron | *Bacillus thuringiensis* |
| 778 | Tetraniliprole | Novaluron | Azadirachtin |
| 779 | Tetraniliprole | Novaluron | Methoxyfenozide |
| 780 | Tetraniliprole | Novaluron | Bifenazate |
| 781 | Tetraniliprole | Novaluron | Fenpyroximate |
| 782 | Tetraniliprole | Novaluron | Pyridaben |
| 783 | Tetraniliprole | Novaluron | Tebufenpyrad |
| 784 | Tetraniliprole | Novaluron | Tolfenpyrad |
| 785 | Tetraniliprole | Novaluron | Indoxacarb |
| 786 | Tetraniliprole | Novaluron | Metaflumizone |
| 787 | Tetraniliprole | Novaluron | Spirodiclofen |
| 788 | Tetraniliprole | Novaluron | Spirotetramet |
| 789 | Tetraniliprole | Novaluron | Flonicamid |
| 790 | Tetraniliprole | Novaluron | Eugenol |
| 791 | Tetraniliprole | Novaluron | Neem oil |
| 792 | Tetraniliprole | Novaluron | Citronella |

In an embodiment, the present invention provides combinations comprising at least three insecticides listed in each isolated individual row selected from row 1 to row 792 of Table 1.

The combinations of the present invention may be formulated in the form of a composition.

Therefore, in an embodiment, the present invention may provide a composition comprising a combination as disclosed in any aspect or embodiment hereinabove; and at least one agrochemically acceptable excipient.

In an embodiment, the present invention may provide a composition comprising a combination comprising at least three insecticides listed in each isolated individual row selected from row 1 to row 792 of Table 1; and at least one agrochemically acceptable excipient.

In an embodiment, the present invention may provide a composition comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least one benzoylphenyl urea insecticide;
(c) at least another insecticide; and
(d) at least one agrochemically acceptable excipient.

In an embodiment, the present invention may provide a composition comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide;
(c) at least another insecticidal active;
(d) at least one other agrochemical active; and
(e) at least one agrochemically acceptable excipient.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic disease control; in case of disease control the type of fungi to be controlled or the application time. This amount of the combinations of the present invention to be applied can be readily deduced by a skilled agronomist.

The compositions of the present invention may be mixed with other agrochemically active including but not limited to herbicide, fungicides, fertilizers, plant growth regulators and the like.

Thus in an embodiment, the present invention may provide compositions comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide; and
(c) at least one other insecticidal active.

In another embodiment, the present invention may provide compositions comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least benzoylphenyl urea insecticide selected from bistrifluron, chlorbenzuron, chlorfluazuron, dichlorbenzuron, diflubenzuron, flucycloxuron, flufenoxuron, hexaflumuron, lufenuron, novaluron, noviflumuron, penfluron, teflubenzuron, Triflumuron; and
(c) at least two other insecticidal actives.

In a specific embodiment, the present invention may provide compositions comprising:
(a) at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole
(b) novaluron; and
(c) at least one other insecticidal active.

In a specific embodiment, the present invention may provide compositions comprising:
(a) at least one diamide insecticide selected from broflanilide, chlorantraniliprole, cyantraniliprole, cyclaniliprole, cyhalodiamide, flubendiamide, tetrachlorantraniliprole, tyclopyrazoflor and tetraniliprole;
(b) chlorfluazuron; and
(c) at least one other insecticidal active.

In a specific embodiment, the present invention may provide compositions comprising:
(a) at least one diamide insecticide selected from broflanilide, chlorantraniliprole, cyantraniliprole, cyclaniliprole, cyhalodiamide, flubendiamide, tetrachlorantraniliprole, tyclopyrazoflor, and tetraniliprole;
(b) lufenuron; and
(c) at least one other insecticidal active.

In an embodiment, the total amount of diamide insecticidal compound in the composition may typically be in the range of 0.1 to 99% by weight, preferably 0.2 to 90% by weight. The total amount of benzoylphenyl urea insecticide in the composition may be in the range of 0.1 to 99% by weight. The total amount of the other insecticidal active in the composition may be in the range of 0.1 to 99% by weight.

In an embodiment, the constituent insecticides of the combination of the present invention may be admixed in ratio of (1-80):(1-80):(1-80) of the benzoylphenyl urea insecticide, amide insecticidal compound and one other insecticide respectively.

In an embodiment, the constituents of the composition of the present invention may be tank mixed and sprayed at the locus of the infection, or may be alternatively be mixed with surfactants and then sprayed.

In an embodiment, the constituents of the composition of the present invention may be used for foliar application, ground or applications to plant propagation materials. In an embodiment, the compositions of the present invention may typically be produced by mixing the actives in the composition with an inert carrier, and adding surfactants and other adjuvants and carriers as needed and formulated into solid, or liquid formulations, including but not limited to wettable powders, granules, dusts, soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminium magnesium silicate and alumina sol, preservatives, colouring agents and stabilization agents such as PAP (acid phosphate isopropyl) and BHT.

In an embodiment the insect pests controlled by the combinations of the present invention may belong to the class Insecta, Arachnida and Nematoda. Exemplary pests may include: from the order Lepidoptera, pests such as *Acleris* spp., *Adoxophyes* spp., *Aegeria* spp., *Agrotis* spp., *Alabama argillaceae, Amylois* spp., *Anticarsia gemmatalis, Archips* spp., *Argyrotaenia* spp., *Autographa* spp., *Busseola fusca, Cadra cautella, Carposina nipponensis, Chilo* spp., *Choristoneura* spp., *Clysia ambiguella, Cnaphalocrocis* spp., *Cnephasia* spp., *Cochylis* spp., *Coleophora* spp., *Crocidolomia* spp., *Cryptophlebia leucotreta, Crysodeixis includens, Cydia* spp., *Diatraea* spp., *Diparopsis castanea, Earias* spp., *Elasmopalpus* spp., *Ephestia* spp., *Eucosma* spp., *Eupoecilia ambiguella, Euproctis* spp., *Euxoa* spp., *Grapholita* spp., *Hedya nubiferana, Heliothis* spp., *Hellula undalis, Hyphantria cunea, Keiferia lycopersicella, Leucoptera scitella, Lithocollethis* spp., *Lobesia botrana, Lymantria* spp., *Lyonetia* spp., *Malacosoma* spp., *Mamestra brassicae, Manduca sexta, Operophtera* spp., *Ostrinia nubilalis, Pammene* spp., *Pandemis* spp., *Panolis flammea, Pectinophora gossypiella, Phthorimaea operculella, Pieris rapae, Pieris* spp., *Plutella xylostella, Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; from the order Coleoptera, pest such as *Agriotes* spp., *Anthonomus* spp., *Atomaria linearis, Ceutorhynchus* spp., *Chaetocnema tibialis, Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata, Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp., *Scarabeidae, Sitophilus* spp., *Sitotroga* spp., *Tenebrio* spp., *Tribolium* spp. and *Trogoderma* spp.; from the order Orthoptera, pests such as *Blatta* spp., *Blattella* spp., *Gryllotalpa* spp., *Leucophaea maderae, Locusta* spp., *Periplaneta* spp. and *Schistocerca* spp.; from the order Isoptera, pests such as *Reticulitermes* spp.; from the order Psocoptera pest such as, *Liposcelis* spp.; from the order Anoplura, pests such as *Haematopinus* spp., *Linognathus* spp., *Pediculus* spp., *Pemphigus* spp. and *Phylloxera* spp.; from the order Mallophaga pests such as *Damalinea* spp. and *Trichodectes* spp.; rom the order Thysanoptera, pests such as *Frankliniella* spp., *Hercinothrips* spp., *Taeniothrips* spp., *Thrips palmi, Thrips tabaci* and *Scirtothrips aurantii*; from the order Heteroptera, pests such as *Dichelops melacanthus, Distantiella theobroma, Dysdercus* spp., *Euchistus* spp., *Eurygaster* spp., *Leptocorisa* spp., *Nezara* spp., *Piesma* spp., *Rhodnius* spp., *Sahlbergella singularis, Scotinophara* spp. and *Triatoma* spp.; from the order Homoptera, insect pests such as *Aleurothrixus floccosus, Aleyrodes brassicae, Aonidiella* spp., *Aphididae, Aphis* spp., *Aspidiotus* spp., *Bemisia tabaci, Ceroplaster* spp., *Chrysomphalus aonidium, Chrysomphalus dictyospermi, Coccus hesperidum, Empoasca* spp., *Eriosoma larigerum, Erythroneura* spp., *Gascardia* spp., *Laodelphax* spp., *Lecanium corni, Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica, Quadraspidiotus* spp., *Rhopalosiphum* spp., *Saissetia* spp., *Scaphoideus* spp., *Schizaphis* spp., *Sitobion* spp., *Trialeurodes vaporariorum, Trioza erytreae* and *Unaspis citri*; from the order Hymenoptera, insect pests such as *Acromyrmex, Athalia rosae, Atta* spp., *Cephus* spp., *Diprion* spp., *Diprionidae, Gilpinia polytoma, Hoplocampa* spp., *Lasius* spp., *Monomorium pharaonis, Neodiprion* spp., *Solenopsis* spp. and *Vespa* spp.; from the order Diptera, insect pests such as Antherigona soccata, *Bibio hortulanus, Ceratitis* spp., *Chrysomyia* spp., *Culex* spp., *Cuterebra* spp., *Dacus* spp., *Delia* spp., *Drosophila melanogaster, Liriomyza* spp., *Melanagromyza* spp., *Orseolia* spp., *Oscinella frit, Pegomyia hyoscyami, Phorbia* spp., *Rhagoletis pomonella, Sciara* spp.; from the order Acarina, pests such as *Acarus siro, Aceria sheldoni, Aculus schlechtendali, Amblyomma* spp., *Argas* spp., *Brevipalpus* spp., *Bryobia praetiosa, Calipitrimerus* spp., *Chorioptes* spp., *Dermanyssus gallinae, Eotetranychus carpini, Eriophyes* spp., *Hyalomma* spp., *Olygonychus pratensis, Ornithodoros* spp., *Panonychus* spp., *Phyllocoptruta* spp. (such as *Phyllocoptruta oleivora*), *Polyphagotarsonemus latus, Psoroptes* spp., *Rhipicephalus* spp., *Rhizoglyphus* spp., *Sarcoptes* spp., *Tarsonemus* spp. and *Tetranychus* spp.; and from the class Nematoda, the species of *Meloidogyne* spp. (for example, *Meloidogyne incoginita* and *Meloidogyne javanica*), *Heterodera* spp. (for example, *Heterodera glycines, Heterodera schachtii, Heterodora avenae* and *Heterodora trifolii*), *Globodera* spp. (for example, *Globodera rostochiensis*), *Radopholus* spp. (for example, *Radopholus similes*), *Rotylenchulus* spp., *Pratylenchus* spp. (for example, *Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Quinisulcius* spp., *Scutellonema* spp., *Xiphinema* spp., and *Tylenchorhynchus* spp.

The compositions of the present invention can be used on agricultural lands such as fields, paddy fields, lawns and orchards or on non-agricultural lands.

The present invention may be used to control diseases in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea*, and *Taxus* cuspidate, etc.

In an embodiment, the constituent insecticides of the combination of the present invention may be admixed in ratio of (1-80):(1-80):(1-80):(1:80)

In an aspect, the present invention may provide methods of controlling fungal diseases and insect pests comprising applying a combination comprising:
(a) at least one at least one diamide insecticide selected from broflanilide, chlorantraniliprole, cyantraniliprole, cyclaniliprole, cyhalodiamide, flubendiamide tetrachlorantraniliprole, tyclopyrazoflor and tetraniliprole;
(b) at least one benzoylphenyl urea insecticide; and
(c) at least one other insecticide.

In an embodiment, the diamide insecticide, the benzoylphenyl urea insecticide, and at least one other insecticide may be selected according to any of the preferred embodiments of the combinations described hereinabove.

The combinations of the present invention may be sold as a pre-mix composition or a kit of parts such that individual actives may be mixed before spraying.

Alternatively, the kit of parts may contain at least one diamide insecticide and the benzoylphenyl urea insecticide pre-mixed and the third insecticidal active may be admixed with an adjuvant such that the two components may be tank mixed before spraying.

Therefore, in an embodiment, the present invention may provide a kit comprising at least three components, each of said component comprising one active ingredient out of the combinations as disclosed in any aspect or embodiment hereinabove.

In an embodiment, the present invention may provide a kit comprising at least three components, each said component comprising individually at least one of said insecticides listed in each isolated individual row selected from row 1 to row 792 of Table 1.

In an embodiment, the present invention may provide a kit comprising:
(a) at least one component comprising at least one insecticidal diamide compound selected from broflanilide, chlorantraniliprole, cyantraniliprole, cyclaniliprole, cyhalodiamide, flubendiamide, tetrachlorantraniliprole, tyclopyrazoflor and tetraniliprole;
(b) at least a second component comprising at least one benzoylphenyl urea insecticide;
(c) at least a third component comprising at least another insecticide.

The composition of the present invention may be applied simultaneously as a tank mix or a formulation or may be applied sequentially. The application may be made to the soil before emergence of the plants, either pre-planting or post-planting, or to a plant propagation material. The application may be made as a foliar spray at different timings during crop development, with either one or two applications early or late post-emergence.

The compositions according to the invention can be applied before or after infection of the useful plants or the propagation material thereof for prevention or curing of infestations of insect pest.

As demonstrated, the addition of a third insecticidal active to a combination of amide insecticidal compound and benzoylphenyl urea insecticides greatly improved the control of pests at a locus as well as improved yield and demonstrated a synergistic effect.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Example 1

Trials were conducted to test the efficacy of the combination of Chlorantraniliprole+Novaluron+Bifenthrin on Fruit and shoot borer in paddy:

TABLE 1

| Sr. No. | Treatments | Dose (gm · ai/ha) | Percent control Fruit and shoot borer | | | |
|---|---|---|---|---|---|---|
| | | | 3 DAA | 7 DAA | 10 DAA | 14 DAA |
| T-1 | Chlorantraniliprole + Novaluron + Bifenthrin | 22.5 + 75 + 40 | 82.3 | 92 | 93.3 | 87.4 |
| T-2 | Chlorantraniliprole + Novaluron + Bifenthrin | 30 + 100 + 60 | 84.3 | 95 | 94.3 | 89.4 |
| T3 | Chlorantraniliprole | 30 | 79.3 | 90 | 88.3 | 78.4 |
| T-4 | Novaluron | 100 | 64.3 | 75 | 68.3 | 64.3 |
| T-5 | Bifenthrin | 60 | 54.3 | 71 | 64.3 | 58.3 |
| T-6 | Control | 0 | 0 | 0 | 0 | 0 |

Conclusion:
Chlorantraniliprole+Novaluron+Bifenthrin at the dosage of 22.5+75+40 and 30+100+60 showed synergistic increased control of Brown planthopper than solo application of Chlorantraniliprole, Novaluron and Bifenthrin. Further there is a significant amount of increase in the yield.

Example 2

Trials were conducted to test the efficacy of the combination of Chlorantraniliprole+Novaluron+Bifenthrin on white ears in paddy:

TABLE 2

| Sr. No. | Treatments | Dose (gm · ai/ha) | Percent control Fruit and shoot borer | | | |
|---|---|---|---|---|---|---|
| | | | 3 DAA | 7 DAA | 10 DAA | 14 DAA |
| T-1 | Chlorantraniliprole + Novaluron + Bifenthrin | 22.5 + 75 + 40 | 82 | 87 | 61 | 41 |
| T-2 | Chlorantraniliprole + Novaluron + Bifenthrin | 30 + 100 + 60 | 85 | 89 | 65 | 40 |
| T3 | Chlorantraniliprole | 30 | 5 | 6 | 5.9 | 4.9 |
| T-4 | Novaluron | 100 | 5 | 6 | 5.9 | 4.9 |
| T-5 | Bifenthrin | 60 | 80 | 79 | 55 | 38 |
| T-6 | Control | 0 | 0 | 0 | 0 | 0 |

Conclusion:
Chlorantraniliprole+Novaluron+Bifenthrin at the dosage of 22.5+75+40 and 30+100+60 showed synergistic increased control of white than solo application of Chlorantraniliprole, Novaluron and Bifenthrin.

The invention claimed is:
1. A combination comprising:
a) chlorantraniliprole;
b) novaluron; and
c) bifenthrin.
2. A composition comprising the combination as claimed in claim 1 and at least one agrochemically acceptable excipient.
3. A method of controlling insect pests at a locus, said method comprising, applying to the locus a composition comprising the combination as claimed in claim 1 and at least one agrochemically acceptable excipient.
4. A kit comprising:
a) chlorantraniliprole;
b) novaluron; and
c) bifenthrin.

* * * * *